US012640850B2

(12) United States Patent
Liu et al.

(10) Patent No.: US 12,640,850 B2
(45) Date of Patent: May 26, 2026

(54) FEEDBACK REPORTING FOR MULTICAST COMMUNICATION IN A NON-TERRESTRIAL NETWORK

(71) Applicant: QUALCOMM Incorporated, San Diego, CA (US)

(72) Inventors: Le Liu, San Jose, CA (US); Alberto Rico Alvarino, San Diego, CA (US); Liangping Ma, San Diego, CA (US); Xiao Feng Wang, San Diego, CA (US); Jae Ho Ryu, San Diego, CA (US); Rebecca Wen-Ling Yuan, San Diego, CA (US); Peter Gaal, San Diego, CA (US); Kazuki Takeda, Minato-ku (JP)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 18/312,549

(22) Filed: May 4, 2023

(65) Prior Publication Data

US 2023/0361928 A1 Nov. 9, 2023

Related U.S. Application Data

(60) Provisional application No. 63/339,269, filed on May 6, 2022.

(51) Int. Cl.
H04L 1/1822 (2023.01)
H04L 1/1812 (2023.01)
(Continued)

(52) U.S. Cl.
CPC ........... H04L 1/1812 (2013.01); H04W 24/08 (2013.01); H04W 84/06 (2013.01)

(58) Field of Classification Search
CPC ... H04L 1/1812; H04L 1/1822; H04L 1/1854; H04L 1/1861; H04L 1/1864;
(Continued)

(56) References Cited

U.S. PATENT DOCUMENTS 11,792,826 B2 * 10/2023 Takeda .................. H04L 1/1896
370/329
11,799,596 B2 * 10/2023 Zhou ..................... H04L 1/1861
(Continued)

FOREIGN PATENT DOCUMENTS

WO WO-2021222394 A1 11/2021
WO WO-2022027195 A1 2/2022
WO WO-2022087364 A2 4/2022

OTHER PUBLICATIONS

InterDigital Inc., Considerations on HARQ Management for Non-Terrestrial Networks, 3GPP TSG RAN WG1 Meeting #92, R1-1802631, 4 pages, Feb. 26 to Mar. 2, 2018.*
(Continued)

*Primary Examiner* — Frank Duong
(74) *Attorney, Agent, or Firm* — Paul M. McAdams; Holland & Hart LLP

(57) ABSTRACT

Methods, systems, and devices for wireless communications are described. The method may include a first network node (e.g., a user equipment (UE)) receiving first control information indicative of a first feedback scheme for multicast transmissions in a non-terrestrial network (NTN) and determining an applied feedback scheme based on the first feedback scheme. The method may also include the first network node monitoring for a multicast transmission and operating in accordance with the applied feedback scheme.

31 Claims, 17 Drawing Sheets

Second Control Message 215
First Control Message 210
Multicast Message 220
Feedback Message 225

200

(51) Int. Cl.
  *H04W 24/08*          (2009.01)
  *H04W 84/06*          (2009.01)

(58) Field of Classification Search
  CPC ................. H04L 1/1685; H04L 1/1887; H04L
        2001/0093; H04W 24/08; H04W 72/1273;
          H04W 72/232; H04W 72/30; H04W
                          84/06
  See application file for complete search history.

(56)                References Cited

U.S. PATENT DOCUMENTS

| | | | |
|---|---|---|---|
| 12,069,586 B2 * | 8/2024 | Papasakellariou .... | H04L 1/1861 |
| 2020/0313806 A1 * | 10/2020 | Wang .................... | H04L 1/1825 |
| 2022/0045803 A1 * | 2/2022 | Lin ....................... | H04L 1/1822 |
| 2022/0046684 A1 | 2/2022 | Rico Alvarino et al. | |
| 2023/0361937 A1 * | 11/2023 | Shrivastava .......... | H04L 1/1887 |

OTHER PUBLICATIONS

International Search Report and Written Opinion—PCT/US2023/
066643—ISA/EPO—Jul. 7, 2023.

\* cited by examiner

205

215

210

220

225

220

225

210

215

105-a 115-a 115-b 115-c

Second Control Message 215

First Control Message 210

Multicast Message 220

Feedback Message 225

200

115-d 105-b

Second Control Information

305

First Control Information

310

Third Control Information

315

320 — Determine Applied Feedback Scheme

Multicast Transmission

325

330 — Operate In Accordance To The Applied Feedback Scheme

335 — Feedback Message

300

410

420

415

405

400

810

820

815

805

800

130

105

115

Network
Entity

Transceiver

1110

Antenna

1115

Communications
Manager

1120

Memory

Code

1130

1125

1140

Processor

1135

1105

1100

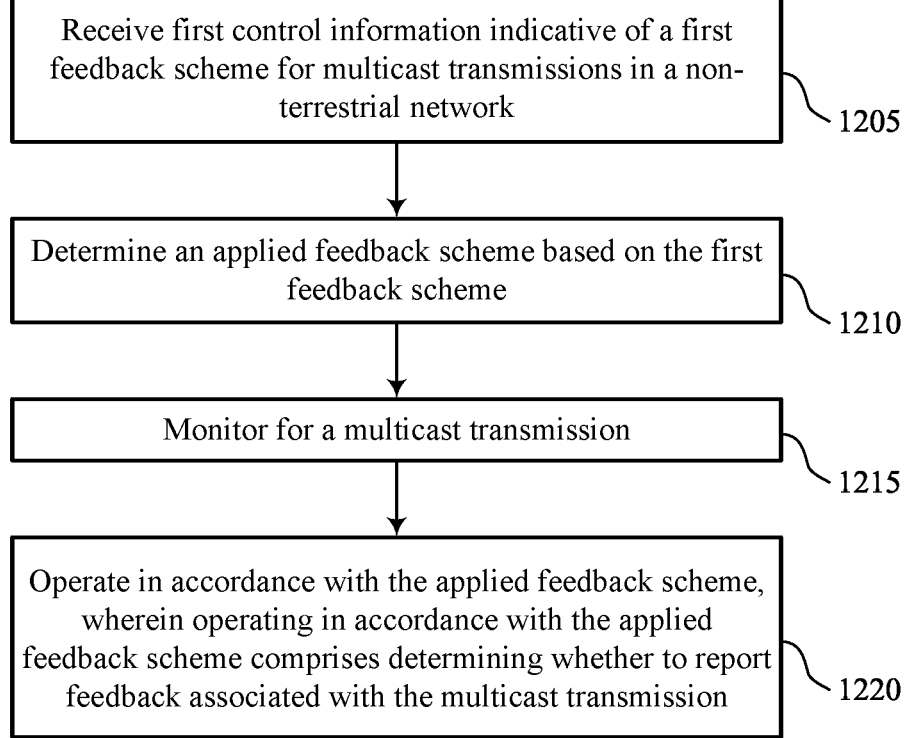

Receive first control information indicative of a first feedback scheme for multicast transmissions in a non-terrestrial network

1205

Determine an applied feedback scheme based on the first feedback scheme

1210

Monitor for a multicast transmission

1215

Operate in accordance with the applied feedback scheme, wherein operating in accordance with the applied feedback scheme comprises determining whether to report feedback associated with the multicast transmission

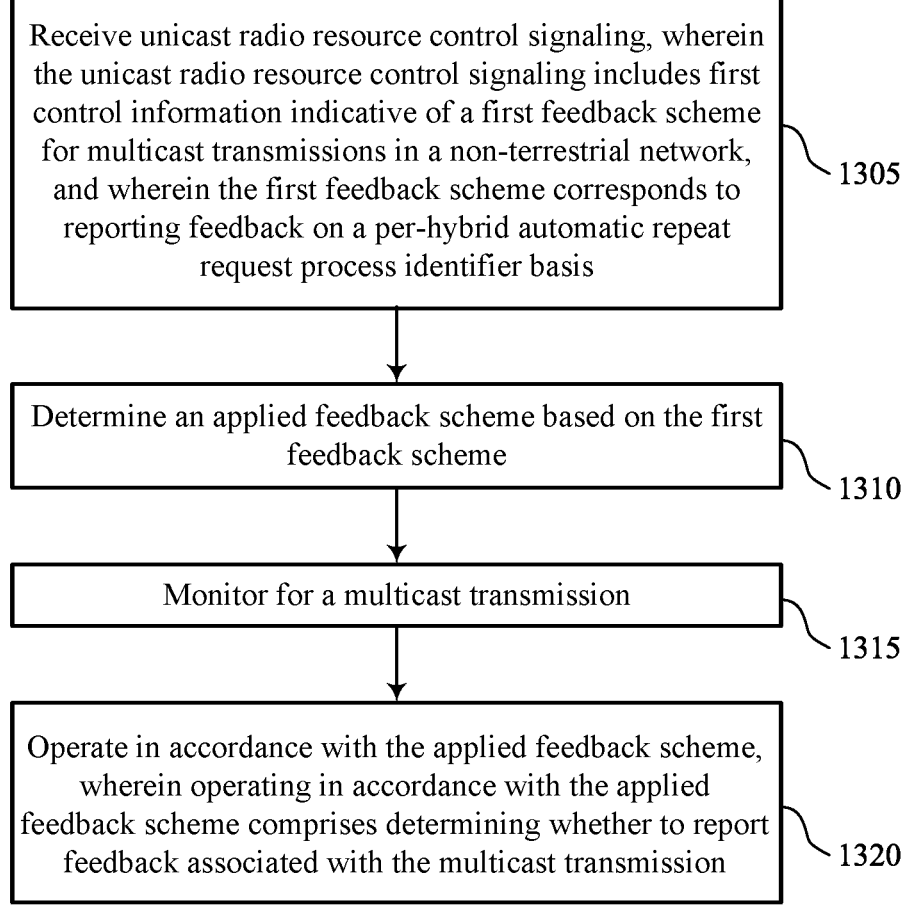

Receive unicast radio resource control signaling, wherein the unicast radio resource control signaling includes first control information indicative of a first feedback scheme for multicast transmissions in a non-terrestrial network, and wherein the first feedback scheme corresponds to reporting feedback on a per-hybrid automatic repeat request process identifier basis

1305

Determine an applied feedback scheme based on the first feedback scheme

1310

Monitor for a multicast transmission

1315

Operate in accordance with the applied feedback scheme, wherein operating in accordance with the applied feedback scheme comprises determining whether to report feedback associated with the multicast transmission

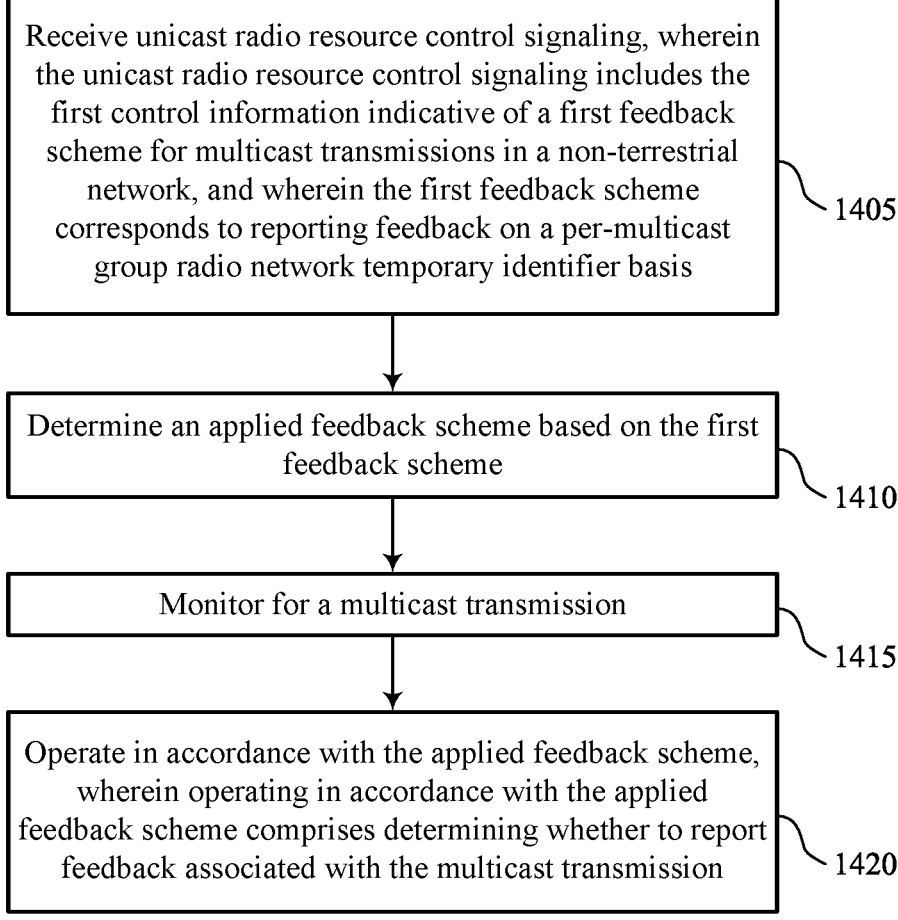

Receive unicast radio resource control signaling, wherein the unicast radio resource control signaling includes the first control information indicative of a first feedback scheme for multicast transmissions in a non-terrestrial network, and wherein the first feedback scheme corresponds to reporting feedback on a per-multicast group radio network temporary identifier basis

1405

Determine an applied feedback scheme based on the first feedback scheme

1410

Monitor for a multicast transmission

1415

Operate in accordance with the applied feedback scheme, wherein operating in accordance with the applied feedback scheme comprises determining whether to report feedback associated with the multicast transmission

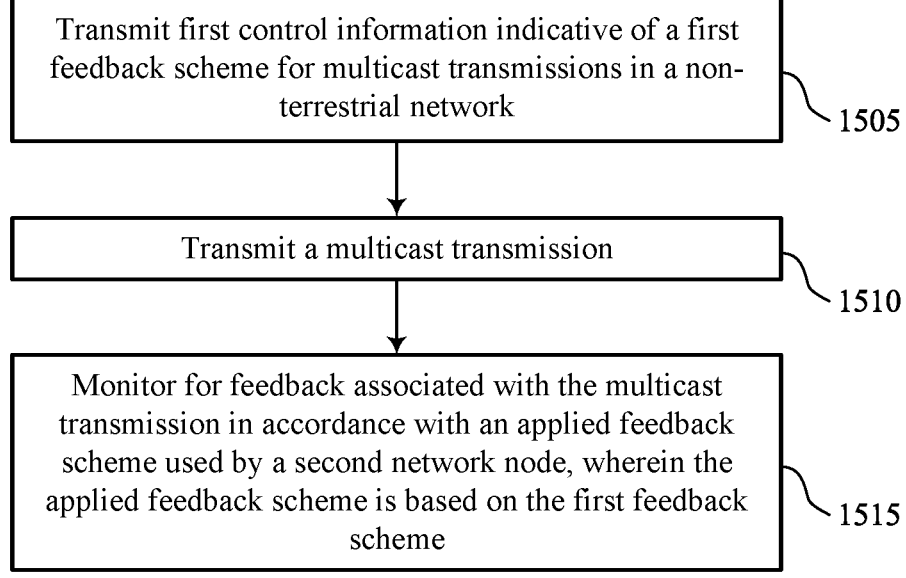

Transmit first control information indicative of a first feedback scheme for multicast transmissions in a non-terrestrial network

1505

Transmit a multicast transmission

1510

Monitor for feedback associated with the multicast transmission in accordance with an applied feedback scheme used by a second network node, wherein the applied feedback scheme is based on the first feedback scheme

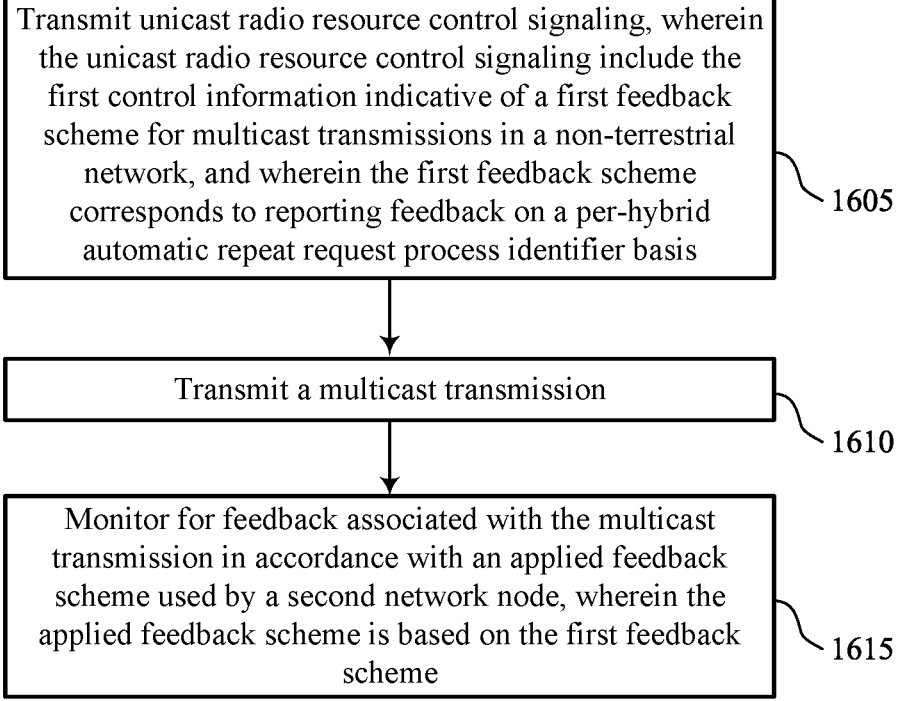

Transmit unicast radio resource control signaling, wherein the unicast radio resource control signaling include the first control information indicative of a first feedback scheme for multicast transmissions in a non-terrestrial network, and wherein the first feedback scheme corresponds to reporting feedback on a per-hybrid automatic repeat request process identifier basis

1605

Transmit a multicast transmission

1610

Monitor for feedback associated with the multicast transmission in accordance with an applied feedback scheme used by a second network node, wherein the applied feedback scheme is based on the first feedback scheme

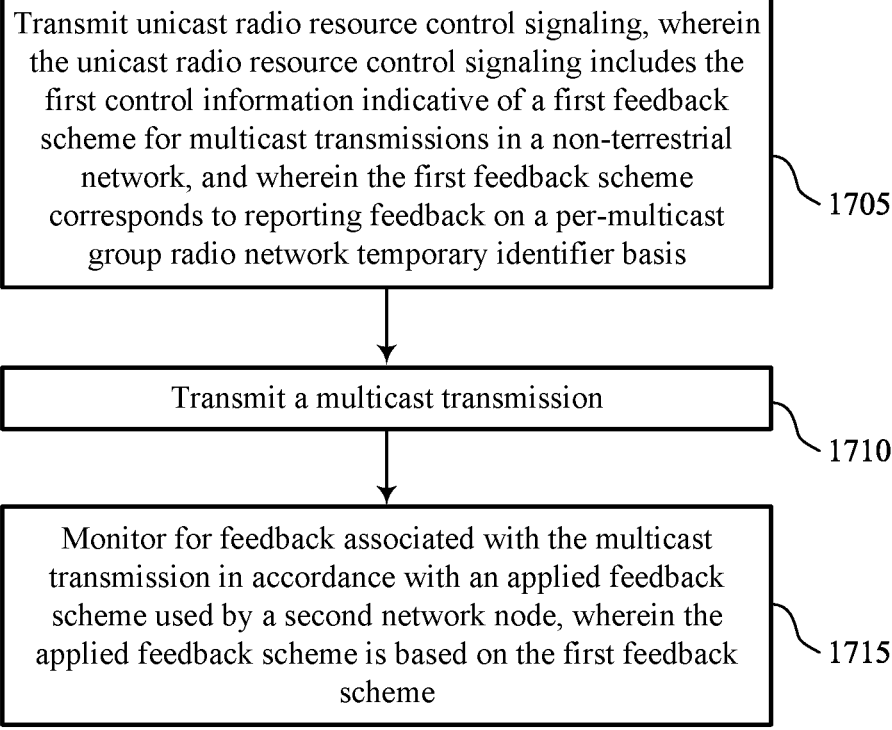

Transmit unicast radio resource control signaling, wherein the unicast radio resource control signaling includes the first control information indicative of a first feedback scheme for multicast transmissions in a non-terrestrial network, and wherein the first feedback scheme corresponds to reporting feedback on a per-multicast group radio network temporary identifier basis

1705

Transmit a multicast transmission

1710

Monitor for feedback associated with the multicast transmission in accordance with an applied feedback scheme used by a second network node, wherein the applied feedback scheme is based on the first feedback scheme

FEEDBACK REPORTING FOR MULTICAST COMMUNICATION IN A NON-TERRESTRIAL NETWORK

CROSS REFERENCE

The present application for patent claims the benefit of U.S. Provisional Patent Application No. 63/339,269 by LIU et al., entitled "FEEDBACK REPORTING FOR MULTI-CAST COMMUNICATION IN A NON-TERRESTRIAL NETWORK," filed May 6, 2022, and assigned to the assignee hereof. U.S. Provisional Patent Application No. 63/339,269 is expressly incorporated by reference herein in its entirety.

INTRODUCTION

The following relates to wireless communications relating to feedback reporting for multicast communication in a non-terrestrial network (NTN).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Aspects of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support feedback reporting for multicast communication in a non-terrestrial network (NTN). For example, the described techniques provide for the enablement or disablement of feedback reporting in an NTN. In some aspects, a user equipment (UE) may receive control information that indicates a feedback scheme. The feedback scheme may be described as a configuration that the UE may use to determine a method of reporting feedback for a multicast downlink transmission scheduled to be received by the UE. In one aspect, the feedback scheme may indicate to enable or disable feedback reporting on a per-hybrid automatic repeat request (HARD) process identifier (ID) basis or a per-group-radio network temporary identifier (G-RNTI) basis. The UE may receive the scheduled multicast downlink signal from a network entity (e.g., a base station) and determine whether to report feedback associated with the downlink signal based on the feedback scheme.

A method for wireless communication at a first network node is described. The method may include receiving first control information indicative of a first feedback scheme for multicast transmissions in an NTN, determining an applied feedback scheme based on the first feedback scheme, monitoring for a multicast transmission, and operating in accordance with the applied feedback scheme, where operating in accordance with the applied feedback scheme may include operations, features, means, or instructions for determining whether to report feedback associated with the multicast transmission.

An apparatus for wireless communication at a first network node is described. The apparatus may include memory and at least one processor coupled to the memory. The at least one processor may be configured to receive first control information indicative of a first feedback scheme for multicast transmissions in an NTN, determine an applied feedback scheme based on the first feedback scheme, monitor for a multicast transmission, and operate in accordance with the applied feedback scheme, where the instructions to operate in accordance with the applied feedback scheme are executable by the processor to cause the apparatus to determine whether to report feedback associated with the multicast transmission.

Another apparatus for wireless communication at a first network node is described. The apparatus may include means for receiving first control information indicative of a first feedback scheme for multicast transmissions in an NTN, means for determining an applied feedback scheme based on the first feedback scheme, means for monitoring for a multicast transmission, and means for operating in accordance with the applied feedback scheme, where the means for operating in accordance with the applied feedback scheme include means for determining whether to report feedback associated with the multicast transmission.

A non-transitory computer-readable medium storing code for wireless communication stored thereon. The code, when executed by a first network node, causes the first network node to receive first control information indicative of a first feedback scheme for multicast transmissions in an NTN, determine an applied feedback scheme based on the first feedback scheme, monitor for a multicast transmission, and operate in accordance with the applied feedback scheme, where the instructions to operate in accordance with the applied feedback scheme are executable to determine whether to report feedback associated with the multicast transmission.

In some aspects of the method, apparatuses, and non-transitory computer-readable medium described herein, the first feedback scheme corresponds to reporting feedback on a per-HARQ process ID basis or on a per-multicast G-RNTI basis.

In some aspects of the method, apparatuses, and non-transitory computer-readable medium described herein, receiving the first control information may include operations, features, means, or instructions for receiving unicast radio resource control (RRC) signaling, where the unicast RRC signaling includes the first control information, and where the first feedback scheme corresponds to reporting feedback on a per-HARQ process ID basis.

Some aspects of the method, apparatuses, and non-transitory computer-readable medium described herein may further include operations, features, means, or instructions for receiving downlink control information (DCI) that associates the multicast transmission with a HARQ process ID.

Some aspects of the method, apparatuses, and non-transitory computer-readable medium described herein may further include operations, features, means, or instructions for receiving unicast RRC signaling, where the unicast RRC signaling includes the first control information, and where the first feedback scheme corresponds to reporting feedback on a per-multicast G-RNTI basis.

Some aspects of the method, apparatuses, and non-transitory computer-readable medium described herein may further include operations, features, means, or instructions for receiving DCI that associates the multicast transmission with a multicast G-RNTI.

In some aspects of the method, apparatuses, and non-transitory computer-readable medium described herein, receiving the first control information may include operations, features, means, or instructions for receiving multicast DCI, where the multicast DCI includes the first control information, and where the first feedback scheme corresponds to reporting feedback on a per-multicast G-RNTI basis, the multicast DCI also associating the multicast transmission with a multicast G-RNTI.

Some aspects of the method, apparatuses, and non-transitory computer-readable medium described herein may further include operations, features, means, or instructions for receiving second control information indicative of a second feedback scheme for multicast transmissions in the NTN, where determining the applied feedback scheme may include operations, features, means, or instructions for determining the applied feedback scheme based on the first feedback scheme and the second feedback scheme.

In some aspects of the method, apparatuses, and non-transitory computer-readable medium described herein, the first feedback scheme corresponds to enabling feedback reporting for a multicast G-RNTI and the second feedback scheme corresponds to disabling feedback reporting for a HARQ process ID.

Some aspects of the method, apparatuses, and non-transitory computer-readable medium described herein may further include operations, features, means, or instructions for receiving DCI that associates the multicast transmission with the multicast G-RNTI and the HARQ ID.

In some aspects of the method, apparatuses, and non-transitory computer-readable medium described herein, a message type of the first control information may be a RRC message type or a DCI message type.

In some aspects of the method, apparatuses, and non-transitory computer-readable medium described herein, the applied feedback scheme may be processed as an error case that results from the first feedback scheme being indicated by the first control information and the second feedback scheme being indicated by the second control information.

In some aspects of the method, apparatuses, and non-transitory computer-readable medium described herein, operating in accordance to the applied feedback scheme may include operations, features, means, or instructions for refraining from reporting the feedback based on the first feedback scheme being indicated by the first control information and the second feedback scheme being indicated by the second control information.

In some aspects of the method, apparatuses, and non-transitory computer-readable medium described herein, operating in accordance to the applied feedback scheme may include operations, features, means, or instructions for populating a codebook with feedback determined from a detection result of the multicast transmission based on the first feedback scheme being indicated by the first control information and the second feedback scheme being indicated by the second control information.

In some aspects of the method, apparatuses, and non-transitory computer-readable medium described herein, operating in accordance to the applied feedback scheme may include operations, features, means, or instructions for populating a codebook with negative acknowledgment (NACK) feedback, based on the first feedback scheme being indicated by the first control information and the second feedback scheme being indicated by the second control information.

Some aspects of the method, apparatuses, and non-transitory computer-readable medium described herein may further include operations, features, means, or instructions for receiving third control information indicating a set of feedback reporting alternatives and determining a feedback reporting alternative from the set of feedback reporting alternatives based on the first feedback scheme being indicated by the first control information and the second feedback scheme being indicated by the second control information, where the applied feedback scheme may be based on the determined feedback reporting alternative.

In some aspects of the method, apparatuses, and non-transitory computer-readable medium described herein, the applied feedback scheme may be based on a feedback codebook type configured for the multicast transmission.

Some aspects of the method, apparatuses, and non-transitory computer-readable medium described herein may further include operations, features, means, or instructions for transmitting, to a second network node, a capability message of the first network node, where the first feedback scheme indicated in the first control information may be based on the capability message.

A method for wireless communication at a first network node is described. The method may include transmitting first control information indicative of a first feedback scheme for multicast transmissions in an NTN, transmitting a multicast transmission, and monitoring for feedback associated with the multicast transmission in accordance with an applied feedback scheme used by a second network node, where the applied feedback scheme is based on the first feedback scheme.

An apparatus for wireless communication at a first network node is described. The apparatus may include memory and at least one processor coupled to the memory. The at least one processor may be configured to transmit first control information indicative of a first feedback scheme for multicast transmissions in an NTN, transmit a multicast transmission, and monitor for feedback associated with the multicast transmission in accordance with an applied feedback scheme used by a second network node, where the applied feedback scheme is based on the first feedback scheme.

Another apparatus for wireless communication at a first network node is described. The apparatus may include means for transmitting first control information indicative of a first feedback scheme for multicast transmissions in an NTN, means for transmitting a multicast transmission, and means for monitoring for feedback associated with the multicast transmission in accordance with an applied feedback scheme used by a second network node, where the applied feedback scheme is based on the first feedback scheme.

A non-transitory computer-readable medium storing code for wireless communication stored thereon. The code, when executed by a first network node, causes the first network node to transmit first control information indicative of a first feedback scheme for multicast transmissions in an NTN, transmit a multicast transmission, and monitor for feedback associated with the multicast transmission in accordance with an applied feedback scheme used by a second network node, where the applied feedback scheme is based on the first feedback scheme.

In some aspects of the method, apparatuses, and non-transitory computer-readable medium described herein, the first feedback scheme corresponds to reporting feedback on a per-HARQ process ID basis or on a per-multicast G-RNTI basis.

In some aspects of the method, apparatuses, and non-transitory computer-readable medium described herein, transmitting the first control information may include operations, features, means, or instructions for transmitting unicast RRC signaling, where the unicast RRC signaling include the first control information, and where the first feedback scheme corresponds to reporting feedback on a per-HARQ process ID basis.

Some aspects of the method, apparatuses, and non-transitory computer-readable medium described herein may further include operations, features, means, or instructions for transmitting DCI that associates the multicast transmission with a HARQ process ID.

In some aspects of the method, apparatuses, and non-transitory computer-readable medium described herein, transmitting the first control information may include operations, features, means, or instructions for transmitting unicast RRC signaling, where the unicast RRC signaling includes the first control information, and where the first feedback scheme corresponds to reporting feedback on a per-multicast G-RNTI basis.

Some aspects of the method, apparatuses, and non-transitory computer-readable medium described herein may further include operations, features, means, or instructions for transmitting DCI that associates the multicast transmission with a multicast G-RNTI.

In some aspects of the method, apparatuses, and non-transitory computer-readable medium described herein, transmitting the first control information may include operations, features, means, or instructions for transmitting multicast DCI, where the multicast DCI includes the first control information, and where the first feedback scheme corresponds to reporting feedback on a per-multicast G-RNTI basis, the multicast DCI also associating the multicast transmission with a multicast G-RNTI.

Some aspects of the method, apparatuses, and non-transitory computer-readable medium described herein may further include operations, features, means, or instructions for transmitting second control information indicative of a second feedback scheme for multicast transmissions in an NTN and identifying the applied feedback scheme based on the first feedback scheme and the second feedback scheme.

In some aspects of the method, apparatuses, and non-transitory computer-readable medium described herein, the first feedback scheme corresponds to enabling feedback reporting for a multicast G-RNTI and the second feedback scheme corresponds to disabling feedback reporting for a HARQ process ID.

In some aspects of the method, apparatuses, and non-transitory computer-readable medium described herein, a message type of the first control information may be a RRC message type or a DCI message type.

Some aspects of the method, apparatuses, and non-transitory computer-readable medium described herein may further include operations, features, means, or instructions for receiving DCI that associates the multicast transmission with the multicast G-RNTI and the HARQ ID.

In some aspects of the method, apparatuses, and non-transitory computer-readable medium described herein, the applied feedback scheme includes the second network node populating a codebook with the feedback associated with the multicast transmission based on the first feedback scheme being indicated by the first control information and the second feedback scheme being indicated by the second control information.

In some aspects of the method, apparatuses, and non-transitory computer-readable medium described herein, the applied feedback scheme includes the second network node populating a codebook with NACK feedback, based on the first feedback scheme being indicated by the first control information and the second feedback scheme being indicated by the second control information.

Some aspects of the method, apparatuses, and non-transitory computer-readable medium described herein may further include operations, features, means, or instructions for transmitting third control information indicating a set of feedback reporting alternatives, where the applied feedback scheme may be based on the set of feedback reporting alternatives.

In some aspects of the method, apparatuses, and non-transitory computer-readable medium described herein, the applied feedback scheme may be based on a feedback codebook type configured for the multicast transmission.

Some aspects of the method, apparatuses, and non-transitory computer-readable medium described herein may further include operations, features, means, or instructions for receive, from the second network node, a capability message of the second network node, where the first feedback scheme indicated in the first control information may be based on the capability message.

BRIEF DESCRIPTION OF THE DRAWINGS

FIGS. 12 through 17 show flowcharts illustrating methods that support feedback reporting for multicast communication in an NTN in accordance with one or more aspects of the present disclosure.

DETAILED DESCRIPTION

In some aspects, a user equipment (UE) may report feedback to a network entity (e.g., a base station). The feedback may indicate whether a downlink signal was successfully or unsuccessfully decoded by the UE. The feedback may be reported in accordance with various feedback schemes depending on what is allowed or configured for a given context. For example, in non-terrestrial-network (NTN) unicast communications, the allowed feedback scheme is for feedback to be reported on a per-hybrid automatic repeat request (HARQ) process identifier (ID) basis. That is, feedback is reported for each transmission or set of transmissions that share a same HARQ process ID. In another aspect, in terrestrial network (TN) multicast communications, the allowed feedback scheme is for feedback to be reported on a per-multicast group radio network temporary identifier (G-RNTI) basis. That is, feedback is reported for each transmission or set of transmissions that share a same multicast G-RNTI. However, a feedback scheme for multicast NTN has yet to be established.

As described herein, the UE may report feedback associated with a multicast message in an NTN. In some aspects, the UE may receive control information that indicates to the UE that a certain type of feedback scheme is enabled or disabled. In one alternative, a unicast radio resource control (RRC) message is transmitted by the network to the UE to enable or disable per-HARQ process ID feedback. In another alternative, a unicast RRC message or a multicast downlink control information (DCI) message may be transmitted by the network to the UE to enable or disable per multicast G-RNTI feedback. Further, in a third alternative, a UE may receive first control information that enables or disables per multicast G-RNTI feedback and second control information that disables or enables per HARQ process ID feedback. In such example, the UE may encounter a scenario in which feedback reporting is both enabled and disabled for a multicast transmission. In which case, the UE may generate a HARQ codebook that carries actual HARQ feedback values, only negative feedback values, or no values at all.

Aspects of the disclosure are initially described in the context of wireless communications systems. Additional aspects are described in the context of a process flow. Aspects of the disclosure are further illustrated by and described with reference to apparatus diagrams, system diagrams, and flowcharts that relate to feedback reporting for multicast communication in an NTN.

Figure 1:
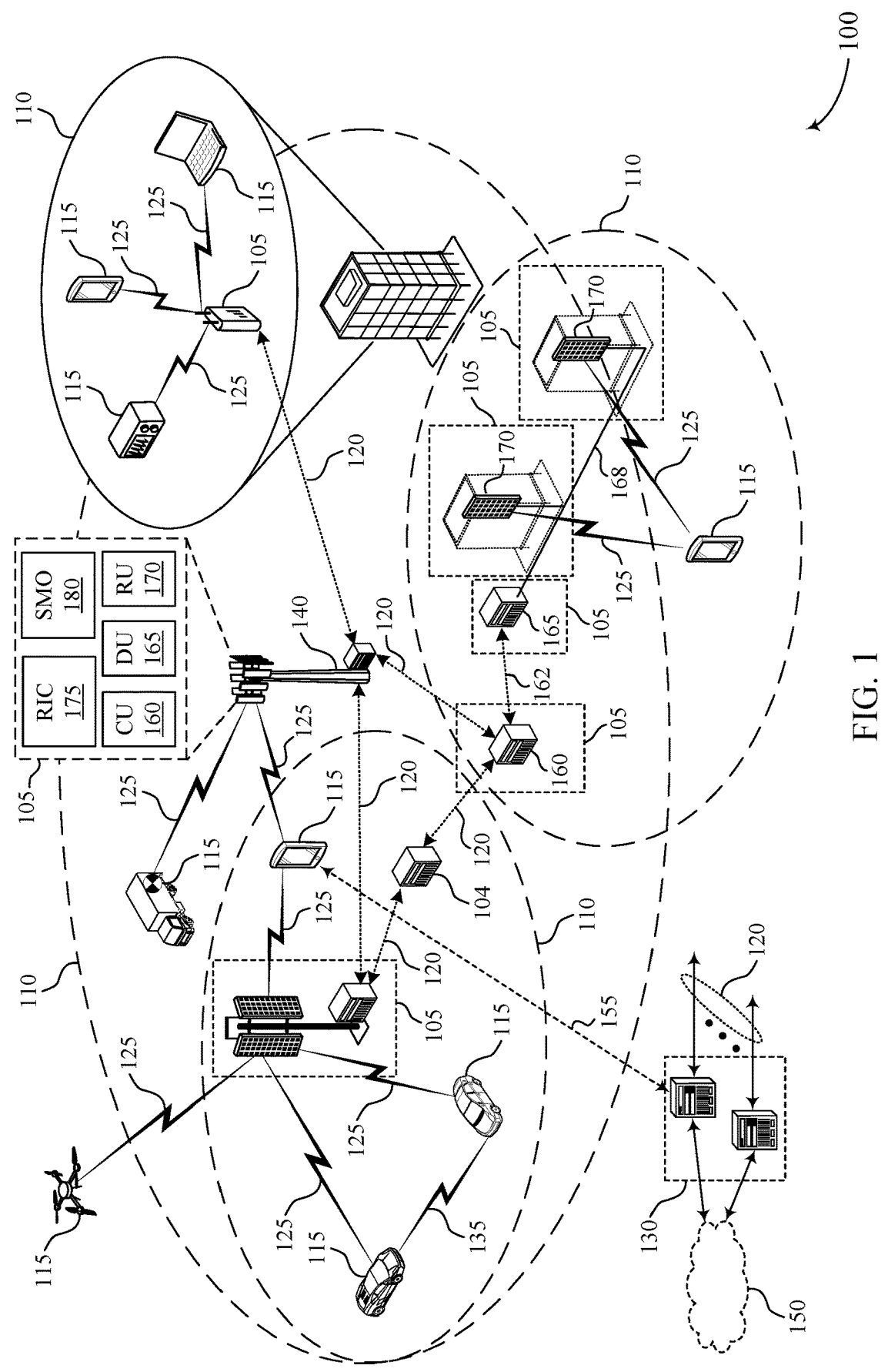
FIGS. 1 and 2 illustrate aspects of a wireless communications system that support feedback reporting for multicast communication in a non-terrestrial network (NTN) in accordance with one or more aspects of the present disclosure.

FIG. 1 illustrates an aspect of a wireless communications system 100 that supports feedback reporting for multicast communication in an NTN in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In some aspects, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an aspect of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another over a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other aspects or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support feedback reporting for multicast communication in an NTN as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other aspects. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other aspects, which may be implemented in various objects such as appliances, or vehicles, meters, among other aspects.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other aspects, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multicarrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In other aspects, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be able to communicate directly with other UEs 115 over a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some aspects, one or more UEs 115 in such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In other aspects, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some aspects, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other aspects.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. HARQ feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, where the device may provide HARQ feedback in a specific slot for data received in a previous symbol in the slot. In other aspects, the device may provide HARQ feedback in a subsequent slot, or according to some other time interval.

In some aspects, the UE 115 may operate in accordance to a feedback scheme in an NTN. In some aspects, the UE 115 may receive control information that indicates the feedback scheme. The feedback scheme may be described as a configuration that the UE 115 may use to determine a method of reporting feedback for a multicast downlink transmission scheduled to be received by the UE 115. In one aspect, the feedback scheme may indicate to enable or disable feedback reporting on a per-HARQ process ID basis or a per-G-RNTI basis. The UE may receive the scheduled multicast downlink signal from the network entity 105 (e.g., a base station) and determine whether to report feedback associated with the downlink signal based on the feedback scheme.

Figure 2:
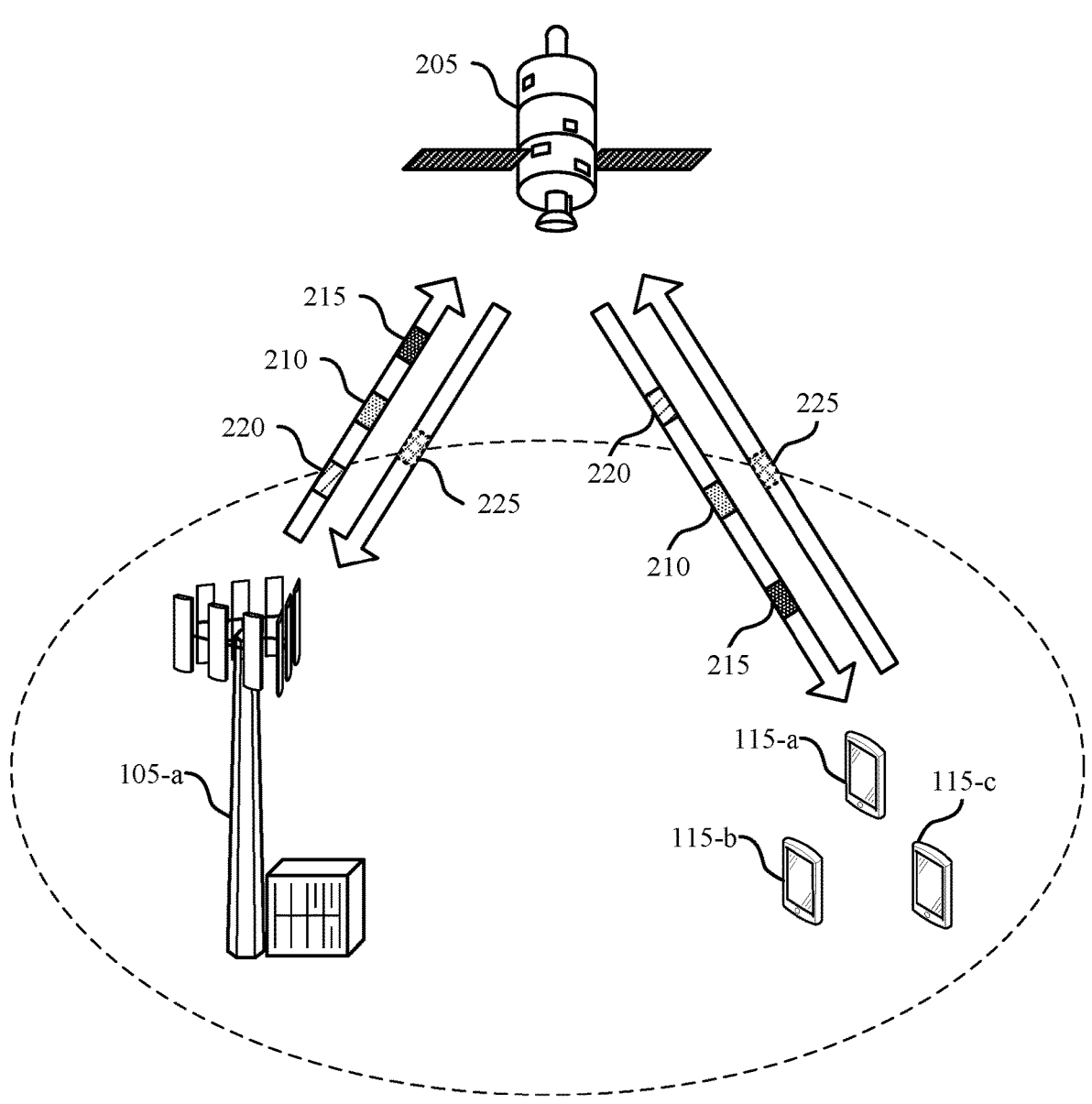

FIG. 2 illustrates an example of a wireless communications system 200 that supports feedback reporting for multicast communication in an NTN in accordance with one or more aspects of the present disclosure. In some aspects, the wireless communications system 200 may implement aspects of a wireless communications system 100. For example, the wireless communications system 200 may include a network entity 105-a and UEs 115 which may be aspects of a network entity 105 and UEs 115 as described with reference to FIG. 1.

In some aspects, the network entity 105-a may communicate with one or more UEs 115 of a group of UEs 115. In one aspect, the network entity 105-a may intend to communicate with only one of the UEs 115 (e.g., unicast communication). For example, the network entity 105-a may intend to communicate with the UE 115-a as opposed to the UE 115-b or the UE 115-c. In such example, the network entity 105-a may transmit DCI to the UE 115-a scheduling the communication, where the DCI is scrambled (e.g., a cyclic redundancy check (CRC) of the DCI is scrambled) by a cell-RNTI (C-RNTI) associated with the UE 115-a. Prior to transmitting the DCI, the network entity 105-a may assign different C-RNTI values to different UEs 115. As such, the UE 115-a may determine that the DCI is intended for the UE 115-a based on identifying that the C-RNTI is assigned to the UE 115-a. The UE 115-a may then receive a unicast signal scheduled by the DCI.

Alternatively, the network entity 105-a may intend to communicate with more than one UE 115 (e.g., multicast communication). For example, the network entity 105-a may intend to communicate with the UE 115-a, the UE 115-b, and the UE 115-c. In such example, the network entity 105-a may transmit DCI to the UE 115-a, the UE 115-b, and the UE 115-c, where the DCI is scrambled (e.g., a CRC of the DCI is scrambled) by a G-RNTI or a G-configured scheduling-RNTI (G-CS-RNTI) associated with the UE 115-a, the UE 115-b, and the UE 115-c. Prior to transmitting the DCI, the network entity 105-a may assign a same G-RNTI value or a same G-CS-RNTI value to different UEs 115. As such, the UE 115-a, the UE 115-b, and the UE 115-c may determine that the DCI is intended for the UE 115-a, the UE 115-b, and the UE 115-c based on identifying that the G-RNTI or the G-CS-RNTI is assigned to the UE 115-a, the UE 115-b, and the UE 115-c. The UE

115-a, the UE 115-b, and the UE 115-c may then receive a multicast signal scheduled by the DCI.

In some aspects, the UE 115 may report feedback information to the network entity 105-a. The feedback information may include an indication of whether the UE 115 successfully decoded a downlink signal received from the network entity 105-a. If the UE 115 successfully decodes the downlink signal, the UE 115 may transmit acknowledgement (ACK) feedback to the network entity 105-a. Alternatively, if the UE 115 does not successfully decode the downlink signal, the UE 115 may transmit negative ACK (NACK) feedback to the network entity 105-a. In response to receiving the NACK feedback, the network entity 105-a may retransmit the downlink signal to the UE 115. In some aspects, the UE 115 may be configured with one of two HARQ codebook types to provide feedback to the network entity 105-a. Examples of HARQ codebook types may be a type 1 HARQ codebook (e.g., a semi-static codebook) and a type 2 HARQ codebook (e.g., a dynamic codebook). The type 1 HARQ codebook may be a fixed size, where the size is a total sum of the transmission occasions of physical downlink shared channel (PDSCH) for a given time. The size of a type 2 HARQ codebook may change according to PDSCH resource allocation. That is, unlike the type 1 HARQ codebook, the type 2 HARQ codebook may not account for unused transmission occasions of the PDSCH.

In some aspects, the UE 115 may operate in an NTN. As opposed to a TN, the NTN may refer to any network that includes non-terrestrial flying objects such as satellites 205, high altitude platform system (HAPS), air-to-ground networks, unmanned aerial vehicles (UAVs), airplanes, etc. In some aspects, the UE 115 operating in the NTN may communicate with the network (e.g., the network entity 105-a) over long distances using a satellite 205 as a relay device. In one aspect, the network entity 105-a may transmit a unicast signal to the satellite 205 and the satellite 205 may transmit (e.g., relay) the unicast signal to the UE 115-a. Additionally, the UE 115-a may provide feedback to network entity 105-a regarding the unicast signal. In some aspects, prior to receiving the unicast signal, the UE 115-a may receive control signaling (e.g., RRC signaling) indicating for the UE 115-a to enable feedback for unicast signaling associated with a first HARQ process ID. Additionally or alternatively, the control signaling or additional control signaling may indicate for the UE 115-a to disable feedback for unicast signaling associated with a second HARQ process ID. A unicast signal may be considered associated with a HARQ process ID, if the DCI scheduling the unicast signal indicates the HARQ process ID.

If the UE 115-a is configured with a type 1 HARQ codebook, the UE 115-a may report NACK feedback (e.g., regardless of the decoding result) for unicast signals associated with the second HARQ process ID and may report a decoding result (e.g., either NACK feedback or ACK feedback) for unicast signaling associated with the first HARQ process ID. In some aspects, regardless of whether feedback reporting for the unicast signal is disabled or enabled, bit fields associated with the feedback reporting in the corresponding DCI may be unchanged. That is, the DCI, in either case, may include bit fields for a priority (PRI), a physical uplink shared channel (PUSCH)-to-HARQ feedback timing, and a downlink assignment index (DAI). If the UE 115-a is configured with a type 2 HARQ codebook, the UE 115-a may not report feedback for unicast signals associated with the second HARQ process ID and may report a decoding result (e.g., NACK feedback or ACK feedback) for unicast signaling associated with the first HARQ process ID. In some aspects, the bit fields associated with the feedback reporting of the unicast signal in the corresponding DCI may depend on whether feedback reporting for the unicast signals is disabled or enabled. For example, when feedback reporting is enabled, the DCI may include bit fields for the PRI, the PUSCH-to-HARQ feedback timing, and the DAI and when feedback reporting is disabled, the DCI may not include one or more of the bits fields for the PRI, the PUSCH-to-HARQ feedback timing, and the DAI (e.g., counter-DAI (C-DAI) or total-DAI (T-DAI)). Alternatively, the bits fields associated with the feedback reporting in the DCI may remain unchanged and the UE 115-*a* may ignore one or more of the bits fields associated with the feedback reporting in the case that feedback reporting is disabled for the unicast signal corresponding to the DCI.

Alternatively, the UE 115 may operate in the TN. In the TN, the network entity 105-*a* may directly transmit a multicast signal to a group of UE 115 (e.g., the UE 115-*a*, the UE 115-*b*, and the UE 115-*c*) and each UE 115 of the group of UEs 115 may report feedback regarding the multicast signal. In one aspect, the UE 115-*a* may receive the multicast signal and report feedback regarding the multicast signal. In some aspects, prior to reporting the feedback, the UE 115-*a* may receive control signaling indicating for the UE 115-*a* to enable feedback for the multicast signal associated with a first RNTI (e.g., a G-RNTI or a G-CS-RNTI). Additionally or alternatively, the control signaling or additional control signaling indicating to disable feedback for the multicast signal associated with a second RNTI (e.g., a G-RNTI or a G-CS-RNTI). In some aspects, the control signaling may be an aspect of RRC signaling. In another aspect, the control signaling may be an aspect of DCI signaling. In such example, the UE 115-*a* may receive second control signaling prior to receiving the control signaling. The second control signaling may configure the DCI (e.g., DCI format 4_2) with the enablement or disablement feature. For example, the UE 115-*a* may receive RRC signaling indicating that if a bit field in the DCI includes a bit that has a logic value of 1, the UE 115-*a* may enable feedback for the multicast signal and if the bit field in the DCI includes a bit that has a logic value of 0, the UE 115-*a* may disable feedback for the multicast signal. A multicast signal may be considered associated with an RNTI if a CRC of the DCI scheduling the multicast signal is scrambled by the RNTI.

If the UE 115-*a* is configured with a type 1 HARQ codebook, the UE 115-*a* may report NACK feedback (e.g., regardless of the decoding result) or a decoding result (e.g., either NACK feedback or ACK feedback) for the multicast signal associated with the second RNTI and may report a decoding result (e.g., either NACK feedback or ACK feedback) for multicast signaling associated with the first RNTI. If the UE 115-*a* is configured with a type 2 HARQ codebook, the UE 115-*a* may not report feedback for multicast cast signals associated with the second RNTI and may report a decoding result (e.g., NACK feedback or ACK feedback) for multicast cast signaling associated with the first RNTI. In addition to unicast signaling, multicast signaling may be supported in the NTN. However, procedures for enabling or disabling reporting of feedback associated with a multicast signal in the NTN have not yet been realized.

As described herein, the UE 115-*a* may receive control signaling enabling or disabling feedback reporting for multicast signaling in the NTN. In one aspect, the network entity 105-*a* may transmit a multicast message 220 to the UE 115-*a* (e.g., via the satellite 205). The UE 115-*a* may receive the multicast message 220 and determine whether to transmit feedback to the network entity 105-*a* (e.g., using the satellite 205 as a relay device) regarding the multicast message 220. In some aspects, the UE 115-*a* may determine whether to transmit feedback regarding the multicast message 220 based on a first control message 210 received from the network entity 105-*a* (e.g., via the satellite 205) prior to receiving the multicast message 220.

In one aspect, the first control message 210 may indicate to enable feedback reporting for multicast signaling that is associated with a first HARQ process ID. Additionally or alternatively, the first control message 210 may indicate to disable feedback reporting for multicast signaling associated with a second HARQ process ID. In such example, the UE 115-*a* may determine the transmit a feedback message 225 for the multicast message 220 using a similar procedure as the one described with respect to feedback reporting for a unicast message in the NTN. That is, if the UE 115-*a* is configured with a type 1 HARQ codebook, the UE 115-*a* may report NACK feedback (e.g., regardless of the decoding result) for the multicast message 220 if the multicast message 220 is associated with the second HARQ process ID and may report a decoding result (e.g., either NACK feedback or ACK feedback) for the multicast message 220 if the multicast message 220 is associated with the first HARQ process ID. If the UE 115-*a* is configured with a type 2 HARQ codebook, the UE 115-*a* may not report feedback for the multicast message 220 if the multicast message 220 is associated with the second HARQ process ID or report a decoding result (e.g., NACK feedback or ACK feedback) for the multicast message 220 and may report a decoding result (e.g., NACK feedback or ACK feedback) for the multicast message 220 if the multicast message is associated with the first HARQ process ID. In such example, the first control message 210 may be an aspect of RRC signaling.

In some aspects, the UE 115-*a* may determine an uplink resource or an uplink slot (e.g., a physical uplink control channel (PUCCH) resource or PUCCH slot) based on the DCI associated with the enabled or disabled feedback for a HARQ process ID, whoever last received. Alternatively, the UE 115-*a* may determine the uplink resource or the uplink slot based on the DCI associated with enabled feedback for a HARQ process ID, but not based on the DCI associated with disabled feedback for a HARQ process ID. In some aspects, the determination of the uplink resource or the uplink slot may be different for type 1 HARQ-ACK codebook and type 2 HARQ-ACK codebook if configured for the multicast signal.

In another aspect, the first control message 210 may indicate to enable feedback reporting for multicast signaling that is associated with a first RNTI. Additionally or alternatively, the first control message 210 may indicate to disable feedback reporting for multicast signaling that is associated with a second RNTI. In such example, the UE 115-*a* may determine the transmit feedback for the multicast message 220 using a similar procedure as feedback reporting for a multicast message in the TN. That is, if the UE 115-*a* is configured with a type 1 HARQ codebook, the UE 115-*a* may report NACK feedback (e.g., regardless of the decoding result) or no feedback for the multicast message 220 if the multicast message 220 is associated with the second RNTI and may report a decoding result (e.g., either NACK feedback or ACK feedback) for the multicast message 220 if the multicast message 220 is associated with the first RNTI. If the UE 115-*a* is configured with a type 2 HARQ codebook, the UE 115-*a* may not report feedback for the multicast message 220 if the multicast message 220 is associated with the second RNTI and may report a decoding result (e.g., NACK feedback or ACK feedback) for the multicast message 220 if the multicast message 220 is associated with the RNTI. In such example, the first control message 210 may be an aspect of RRC signaling or DCI signaling. In the case that the first control message 210 includes DCI signaling, the UE 115-a may receive a second control message 215 prior to receiving the first control message 210 configuring the first control message 210 with the enablement or disablement feature.

In some aspects, the UE 115-a may determine an uplink resource or an uplink slot (e.g., a physical uplink control channel (PUCCH) resource or PUCCH slot) based on the DCI associated with the enabled or disabled feedback for an RNTI, whoever last received. Alternatively, the UE 115-a may determine the uplink resource or the uplink slot based on the DCI associated with enabled feedback for an RNTI, but not based on the DCI associated with disabled feedback for an RNTI. In some aspects, the determination of the uplink resource or the uplink slot may be different for type 1 HARQ-ACK codebook and type 2 HARQ-ACK codebook if configured for the multicast signal.

In yet another aspect, the first control message 210 may indicate to enable or disable feedback reporting for multicast signaling that is associated with a HARQ process ID and a third control message may indicate to enable or disable feedback reporting for multicast signaling that is associated with an RNTI. Table 1 illustrates aspects of possible combinations of feedback enabled or feedback disabled HARQ process IDs and RNTIs that the UE 115-a may encounter.

As shown in Table 1, the UE 115-a may encounter a scenario where the multicast message 220 is associated with a HARQ process ID and an RNTI of different enablement or disablement states. For example, the UE 115-a may receive a multicast message 220 that is associated with an RNTI with enabled feedback by RRC signaling and a HARQ process ID with disabled feedback by the RRC signaling. In such scenario, the UE 115-a may act in accordance to one of case 1, case 2, case 3, or case 4 of row 1, column 2 of the Table 1. In case 1, the UE may undergo an error case, where the UE 115-a is not expected to receive the multicast message 220 that is associated with an RNTI with enabled feedback by RRC signaling and a HARQ process ID with disabled feedback by the RRC signaling. That is, it may up to UE implementation on whether the UE 115-a detects the multicast message 220 or not. Even if the UE 115-a detects the multicast message 220, the UE 115-a may not transmit feedback for the multicast message 220. In case 2, the UE 115-a may detect the multicast message 220 but refrain from reporting feedback for the multicast message 220. In case 3, the UE 115-a may detect the multicast message 220 and report the (e.g., real) decoding result of the multicast message 220 and in case 4, the UE 115-a may not detect the multicast message 220 and report NACK feedback for the multicast message 220. In some aspects, the network entity 105-a may configure the UE 115-a with the different cases and the UE 115-a may select which case to implement based on a message type (e.g., RRC or DCI) of the first control message 210 and the third control message. In some aspects, the network entity 105-a may refrain from sending the UE 115-a multicast signal associated with conflicting states. For example, the network entity 105-a may refrain from using a DCI associated with a HARQ process ID with disabled feedback to schedule a multicast message 220 associated with an RNTI with enabled feedback.

The UE 115-a may operate in a similar manner if the feedback for the RNTI is enabled by DCI, where the DCI is associated with a HARQ process ID with disabled feedback, and the UE 115-a is configured with a type-2 codebook as illustrated in row 2, column 2 of Table 1. However, if the UE 115-a is configured with a type-1 codebook, the UE 115-a may act in accordance to case 1 or case 2 of row 2, column 2 of Table 1. In case 1, the UE may undergo an error case. That is, it may up to UE implementation on whether the UE 115-a detects the multicast message 220 or not. Even if the UE 115-a detects the multicast message 220, the UE 115-a may not transmit feedback for the multicast message 220. In case 2, the UE 115-a may report the (e.g., real) decoding result of the multicast message 220.

In another aspect, the UE 115-a determine whether to transmit feedback for the multicast message 220 of conflicting states based on priority information. For example, the UE 115-a may identify that the RNTI with the feedback enabled by RRC is associated with a first priority and the HARQ process ID with the feedback disabled by RRC is associated with second priority. If the second priority is higher than the first priority, the UE 115-a may act in accordance to case 2 and not report feedback or the UE 115-a may act in accordance to case 4 and report negative feedback. If the first priority is higher than the second priority, the UE 115-a may act in accordance to case 3 and report real feedback or feedback based on a decoding result of the multicast message 220.

In another aspect, the UE 115-a may receive a multicast message 220 that is associated with an RNTI with the feedback disabled by RRC signaling and a HARQ process ID with the feedback disabled by the RRC signaling. In such scenario, if the UE 115-a is configured to use a type-2 codebook, the UE 115-a may act in accordance to case 1 of row 3, column 2 of Table 1 and refrain from reporting feedback for the multicast message 220. Alternatively, if the UE 115-a is configured to use a type-1 codebook, the UE 115-a may implement case 1 or case 2 of row 3, column 2 of Table 1. In case 1, the UE 115-a may report the (e.g., real) decoding result of the multicast message 220 and in case 2, the UE 115-a may report NACK feedback for the multicast message 220.

In yet another aspect, the UE 115-a may receive a multicast message 220 that is associated with an RNTI with the feedback disabled by DCI signaling and a HARQ process ID with the feedback disabled by RRC signaling. In such scenario, if the UE 115-a is configured to use a type-2 codebook, the UE 115-a may act in accordance to case 1 of row 4, column 2 of Table 1 and refrain from reporting feedback for the multicast message 220. Alternatively, if the UE 115-a is configured to use a type-1 codebook, the UE 115-a may implement case 1, case 2, or case 3 of row 4, column 2 of Table 1. In case 1, the UE 115-a may undergo an error case. In case 2, the UE 115-a may report the (e.g., real) decoding result of the multicast message 220 and in case 3, the UE 115-a may report NACK feedback for the multicast message 220.

In some aspects, the UE 115-a may determine an uplink resource or an uplink slot (e.g., a physical uplink control channel (PUCCH) resource or PUCCH slot) based on the DCI associated with the enabled or disabled feedback for an RNTI or HARQ process ID, whoever last received. Alternatively, the UE 115-a may determine the uplink resource or the uplink slot based on the DCI associated with enabled feedback for an RNTI or HARQ process ID, but not based on the DCI associated with disabled feedback for an RNTI or HARQ process ID. In some aspects, the determination of the uplink resource or the uplink slot may be different for type 1 HARQ-ACK codebook and type 2 HARQ-ACK codebook if configured for the multicast signal.

23

TABLE 1

| | HARQ Process ID Enabled by RRC | HARQ Process ID Disabled by RRC |
|---|---|---|
| RNTI Enabled by RRC | Real Feedback | Case 1: Error<br>Case 2: No Feedback<br>Case 3: Real Feedback<br>Case 4: Negative Feedback |
| RNTI Enabled by DCI | Type 2 Codebook:<br>Real Feedback<br>Type 1 Codebook:<br>Case 1: Error<br>Case 2: Real Feedback | Type 2 Codebook:<br>Case 1: Error<br>Case 2: No Feedback<br>Case 3: Real Feedback<br>Case 4: Negative Feedback<br>Type 1 Codebook:<br>Case 1: Error<br>Case 2: Real Feedback |
| RNTI Disabled by RRC | Type 2 Codebook:<br>No Feedback<br>Type 1 Codebook:<br>Case 1: Real Feedback<br>Case 2: Negative Feedback | Type 2 Codebook:<br>No Feedback<br>Type 1 Codebook:<br>Case 1: Real Feedback<br>Case 2: Negative Feedback |
| RNTI Disabled by DCI | Type 2 Codebook:<br>No Feedback<br>Type 1 Codebook:<br>Case 1: Error<br>Case 2: Real Feedback<br>Case 3: Negative Feedback | Type 2 Codebook:<br>No Feedback<br>Type 1 Codebook:<br>Case 1: Error<br>Case 2: Real Feedback<br>Case 3: Negative Feedback |

Figure 3:
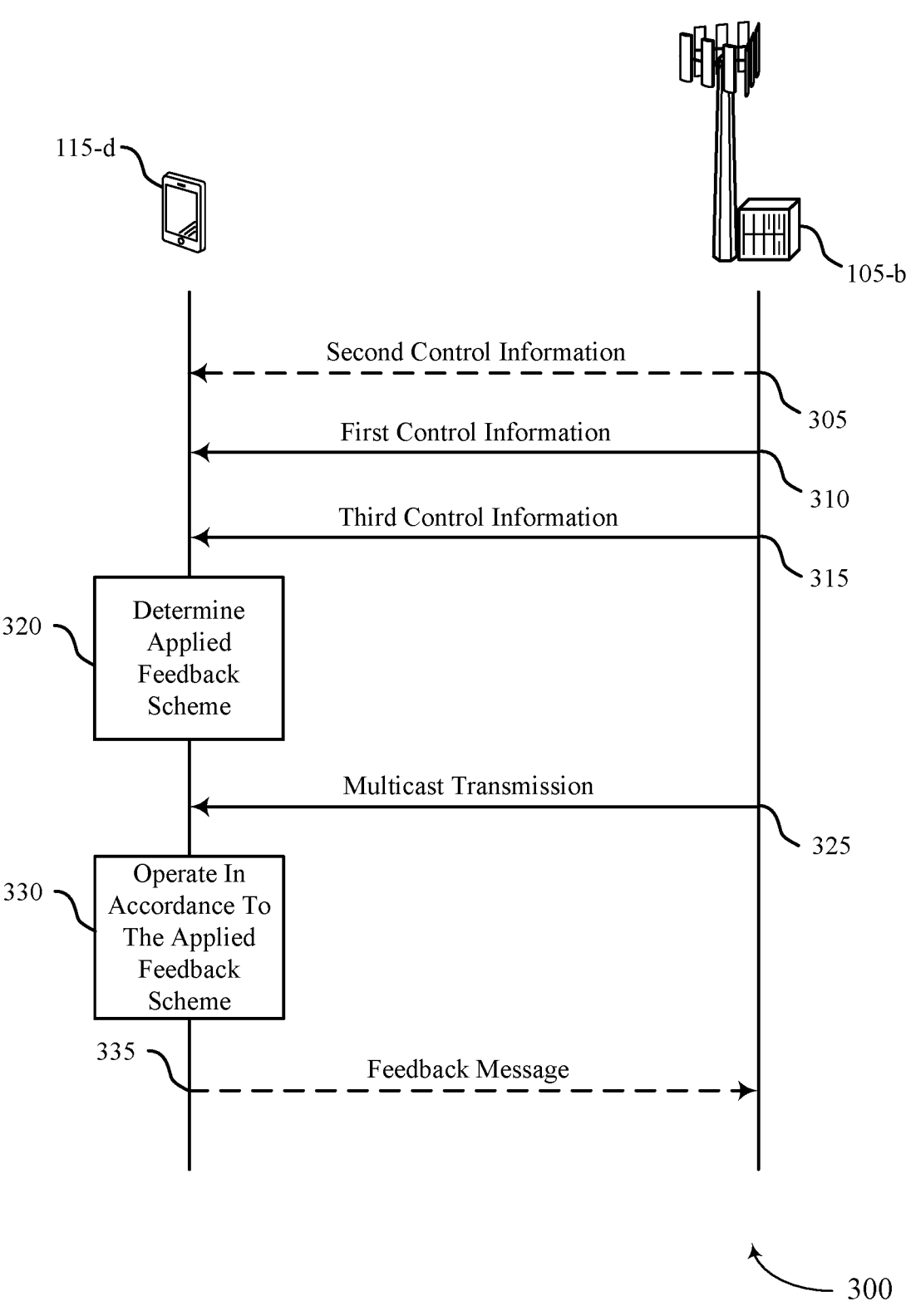
FIG. 3 illustrates an aspect of a process flow that supports feedback reporting for multicast communication in an NTN in accordance with one or more aspects of the present disclosure.

FIG. 3 illustrates an aspect of a process flow 300 that supports feedback reporting for multicast communication in an NTN in accordance with one or more aspects of the present disclosure. In some aspects, the process flow 300 may be implemented by aspects of a wireless communications system 100 and a wireless communications system 200. For example, the process flow 300 may be implemented by a UE 115-d or a network entity 105-b which may be aspects of a network entity 105 or a UE 115 as described with reference to FIGS. 1 and 2. Alternative aspects of the following may be implemented, where some steps are performed in a different order than described or are not performed at all. In some cases, steps may include additional features not mentioned below, or further steps may be added.

In some aspects, the UE 115-d and the network entity 105-b may operate in an NTN. While operating in the NTN, the UE 115-d and the network entity 105-b may communicate with one another over large distances using a non-terrestrial flying object (e.g., a satellite) as a relay device.

At 310, the UE 115-d may receive first control information from the network entity 105-b. The first control information may indicate a first feedback scheme for multicast transmissions in an NTN. The first control information may be an aspect of RRC signaling or DCI signaling. In the case that the first control information includes DCI signaling, the UE 115-d may receive second control information (e.g., RRC signaling) prior to the first control information at 305. The second control information may configure the first control message with the ability to indicate the first feedback scheme. Additionally or alternatively, the UE 115-d may receive third control information at 315 indicating a second feedback scheme for multicast transmission in the NTN. In one aspect, the first control information may indicate to enable or disable feedback reporting on a per-RNTI basis and the third control information may indicate to enable or disable feedback reporting on a per-HARQ process ID basis. In some aspects, the UE 115-d may transmit a capability message of the UE 115-d to the network entity 105-b and the first feedback scheme indicated in the first control information may be based on the capability message.

24

At 320, the UE 115-d may determine an applied feedback scheme based on the first feedback scheme indicated in the first control information. Additionally or alternatively, the UE 115-d may determine the applied feedback scheme based on the second feedback scheme. If the UE 115-d solely receives the first control information, the UE 115-d may determine the applied scheme is the first feedback scheme. Similarly, if the UE solely receives the third control information, the UE 115-d may determine the applied scheme is the second feedback scheme. Alternatively, if the UE 115-d receives both the first control information and the third control information, the UE 115-d may determine the applied feedback scheme based on both the first feedback scheme, the second feedback scheme and potentially, a message type of the first control information or the third control information. As an example, the applied feedback scheme may include the UE 115-d refraining from reporting feedback, the UE 115-d populating a codebook with the feedback determined from a detection result of the multicast transmission, or the UE 115-d populating a codebook with NACK. In some aspects, the network entity 105-b may configure the UE 115-d with different options for the applied feedback scheme and the UE 115-d may select the option for the applied feedback scheme based on one or more conditions.

At 325, the UE 115-d may monitor for and receive a multicast transmission from the network entity 105-b. In some aspects, prior to monitoring for the multicast transmission, the UE 115-d may receive DCI signaling scheduling the multicast message. The DCI signaling may associate the multicast transmission with one or both of a HARQ process ID indicated in the first control information or an RNTI indicated in the third control information. For example, the DCI may be CRC scrambled by the RNTI and/or the DCI may indicate the HARQ process ID.

At 330, the UE 115-d may operate in accordance to the applied feedback scheme. That is, the UE 115-d may determine whether to report feedback associated with the multicast transmission at 335. In one aspect, the UE 115-d may determine to report ACK feedback or NACK feedback (e.g., a decoding result) for the multicast transmission based on the third control information indicating the enabled state for the HARQ process ID. Alternatively, the UE 115-d may determine to report NACK feedback for the multicast transmission (e.g., if configured with a type 1 HARQ codebook) or not report feedback for the multicast transmission (e.g., if configured with a type 2 HARQ codebook) based on the third control information indicating the disabled state for the HARQ process ID.

In another aspect, the UE 115-d may determine to report ACK feedback or NACK feedback (e.g., decoding result) for the multicast transmission based on the first control information indicating the enabled state for the RNTI. Alternatively, the UE 115-d may determine to report NACK feedback or ACK feedback for the multicast transmission (e.g., if configured with a type 1 HARQ codebook), report only NACK feedback for the multicast transmission (e.g., if configured with a type 1 HARQ codebook), or not report feedback for the multicast transmission (e.g., if configured with a type 2 HARQ codebook) based on the first control information indicating the disabled state for the RNTI.

In yet another aspect, the UE 115-d may determine whether to report feedback for the multicast transmission based on a combination of the enabled state or the disabled state for the RNTI and the HARQ process ID. For example, the UE 115-d may determine to report ACK feedback or NACK feedback (e.g., a decoding result of the multicast transmission) if the first control information indicates the enabled state for the RNTI and the third control information indicates the enabled state for the HARQ process ID.

Figure 4:
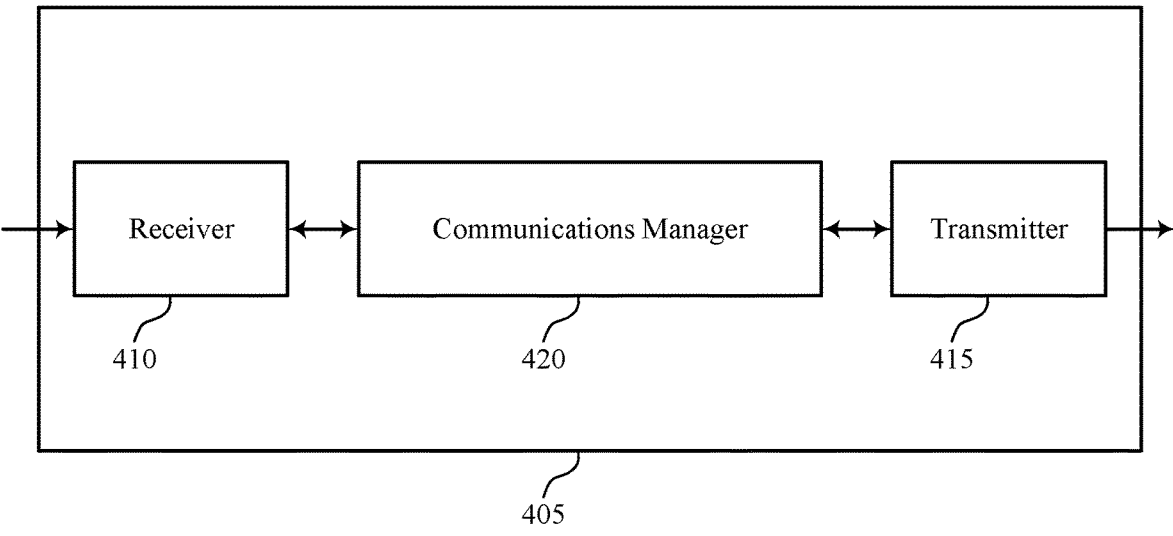
FIGS. 4 and 5 show block diagrams of devices that support feedback reporting for multicast communication in an NTN in accordance with one or more aspects of the present disclosure.

FIG. 4 shows a block diagram 400 of a device 405 that supports feedback reporting for multicast communication in an NTN in accordance with one or more aspects of the present disclosure. The device 405 may be an example of aspects of a UE 115 or a network node as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to feedback reporting for multicast communication in an NTN). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to feedback reporting for multicast communication in an NTN). In some aspects, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be aspects of means for performing various aspects of feedback reporting for multicast communication in an NTN as described herein. For example, the communications manager 420, the receiver 410, the transmitter 415, or various combinations or components thereof may support a method for performing one or more of the functions described herein.

In some aspects, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a first network node in accordance with aspects as disclosed herein. For example, the communications manager 420 may be configured as or otherwise support a means for receiving first control information indicative of a first feedback scheme for multicast transmissions in an NTN. The communications manager 420 may be configured as or otherwise support a means for determining an applied feedback scheme based on the first feedback scheme. The communications manager 420 may be configured as or otherwise support a means for monitoring for a multicast transmission. The communications manager 420 may be configured as or otherwise support a means for operating in accordance with the applied feedback scheme. In some aspects, to operate in accordance with the applied feedback scheme, the communications manager 420 may be configured as or otherwise support a means for determining whether to report feedback associated with the multicast transmission.

By including or configuring the communications manager 420 in accordance with aspects as described herein, the device 405 (e.g., a processor controlling or otherwise coupled with the receiver 410, the transmitter 415, the communications manager 420, or a combination thereof) may support techniques reduced processing and more efficient utilization of communication resources.

Figure 5:
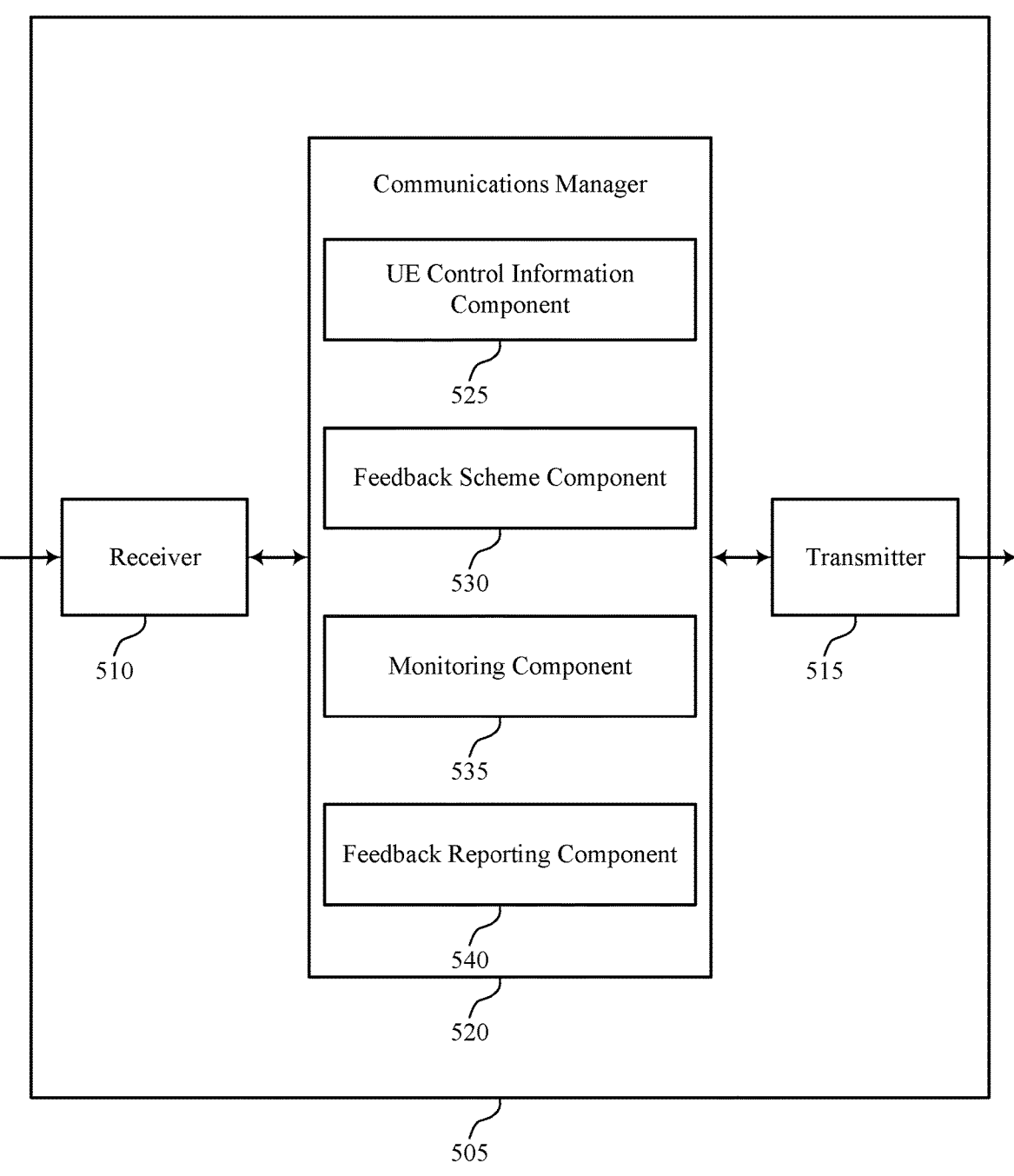

FIG. 5 shows a block diagram 500 of a device 505 that supports feedback reporting for multicast communication in an NTN in accordance with one or more aspects of the present disclosure. The device 505 may be an example of aspects of a device 405, a UE 115, or a network node as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to feedback reporting for multicast communication in an NTN). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to feedback reporting for multicast communication in an NTN). In some aspects, the transmitter 515 may be co-located with a receiver 510 in a transceiver module. The transmitter 515 may utilize a single antenna or a set of multiple antennas.

The device 505, or various components thereof, may be an aspect of means for performing various aspects of feed-back reporting for multicast communication in an NTN as described herein. For example, the communications man-ager 520 may include a UE control information component 525, a feedback scheme component 530, a monitoring component 535, a feedback reporting component 540, or any combination thereof. The communications manager 520 may be an example of aspects of a communications manager 420 as described herein. In some aspects, the communica-tions manager 520, or various components thereof, may be configured to perform various operations (e.g., receiving, obtaining, monitoring, outputting, transmitting) using or otherwise in cooperation with the receiver 510, the trans-mitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first network node in accordance with aspects as disclosed herein. The UE control information component 525 may be configured as or otherwise support a means for receiving first control information indicative of a first feedback scheme for multicast transmissions in an NTN. The feedback scheme component 530 may be con-figured as or otherwise support a means for determining an applied feedback scheme based on the first feedback scheme. The monitoring component 535 may be configured as or otherwise support a means for monitoring for a multicast transmission. The feedback reporting component 540 may be configured as or otherwise support a means for operating in accordance with the applied feedback scheme. In some aspects, to operate in accordance with the applied feedback scheme, the feedback reporting component 540 may be configured as or otherwise support a means for determining whether to report feedback associated with the multicast transmission.

Figure 6:
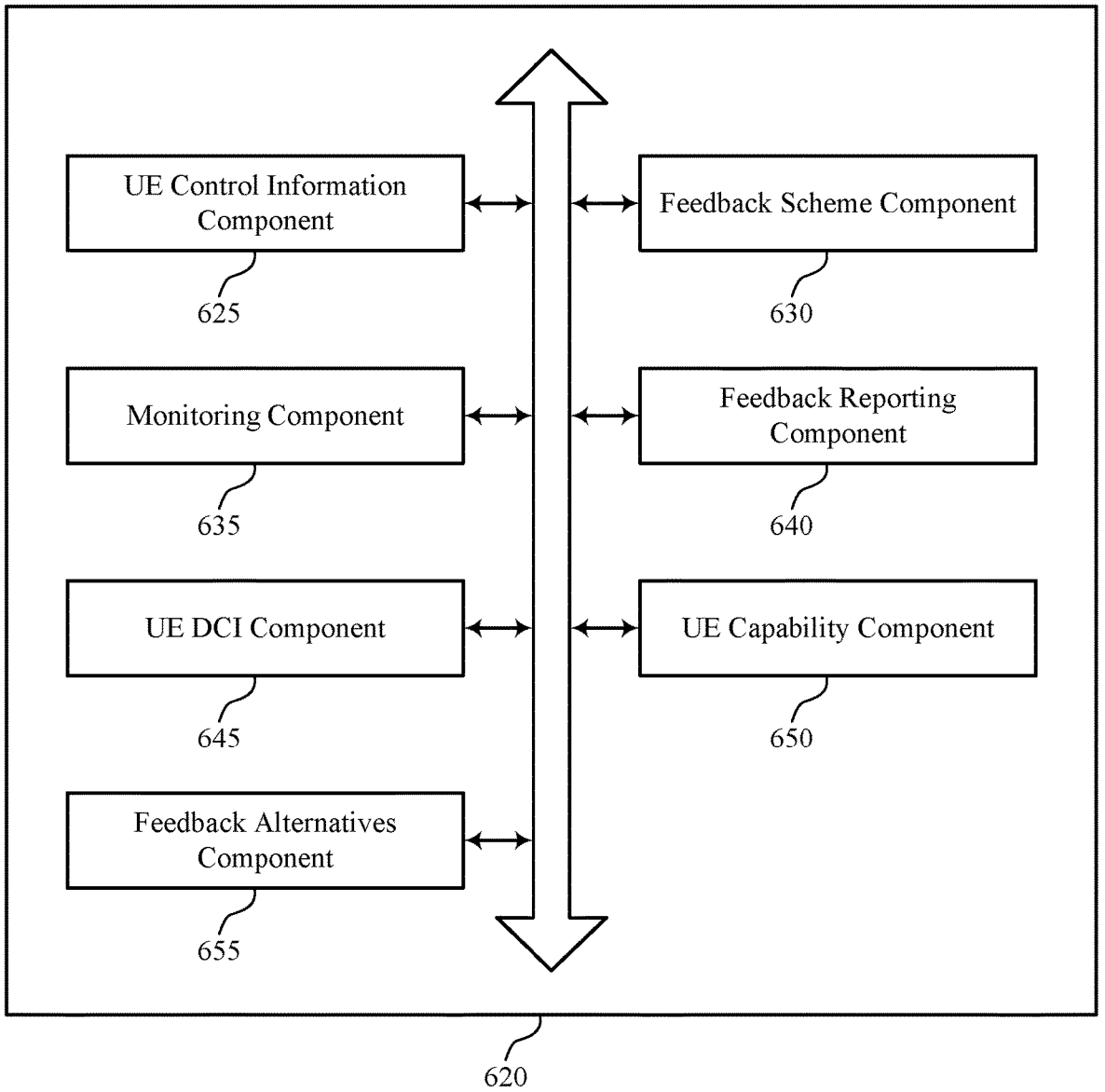
FIG. 6 shows a block diagram of a communications manager that supports feedback reporting for multicast communication in an NTN in accordance with one or more aspects of the present disclosure.

FIG. 6 shows a block diagram 600 of a communications manager 620 that supports feedback reporting for multicast communication in an NTN in accordance with one or more aspects of the present disclosure. The communications man-ager 620 may be an example of aspects of a communications manager 420, a communications manager 520, or both, as described herein. The communications manager 620, or various components thereof, may be an aspect of means for performing various aspects of feedback reporting for mul-ticast communication in an NTN as described herein. For example, the communications manager 620 may include a UE control information component 625, a feedback scheme component 630, a monitoring component 635, a feedback reporting component 640, a UE DCI component 645, a UE capability component 650, a feedback alternatives compo-nent 655, or any combination thereof. Each of these com-ponents may communicate, directly or indirectly, with one another (e.g., via one or more buses).

The communications manager 620 may support wireless communication at a first network node in accordance with aspects as disclosed herein. The UE control information component 625 may be configured as or otherwise support a means for receiving first control information indicative of a first feedback scheme for multicast transmissions in an NTN. The feedback scheme component 630 may be configured as or otherwise support a means for determining an applied feedback scheme based on the first feedback scheme. The monitoring component 635 may be configured as or otherwise support a means for monitoring for a multicast transmission. The feedback reporting component 640 may be configured as or otherwise support a means for operating in accordance with the applied feedback scheme. In some aspects, to operate in accordance with the applied feedback scheme, the feedback reporting component 640 may be configured as or otherwise support a means for determining whether to report feedback associated with the multicast transmission.

In some aspects, the first feedback scheme corresponds to reporting feedback on a per-HARQ process ID basis or on a per-multicast G-RNTI basis.

In some aspects, to support receiving the first control information, the UE control information component 625 may be configured as or otherwise support a means for receiving unicast RRC signaling, where the unicast RRC signaling includes the first control information, and where the first feedback scheme corresponds to reporting feedback on a per-HARQ process ID basis.

In some aspects, the UE DCI component 645 may be configured as or otherwise support a means for receiving DCI that associates the multicast transmission with a HARQ process ID.

In some aspects, receiving unicast RRC signaling, where the unicast RRC signaling includes the first control infor-mation, and where the first feedback scheme corresponds to reporting feedback on a per-multicast G-RNTI basis.

In some aspects, the UE DCI component 645 may be configured as or otherwise support a means for receiving DCI that associates the multicast transmission with a mul-ticast G-RNTI.

In some aspects, to support receiving the first control information, the UE DCI component 645 may be configured as or otherwise support a means for receiving multicast DCI, where the multicast DCI includes the first control informa-tion, and where the first feedback scheme corresponds to reporting feedback on a per-multicast G-RNTI basis, the multicast DCI also associating the multicast transmission with a multicast G-RNTI.

In some aspects, the UE control information component 625 may be configured as or otherwise support a means for receiving second control information indicative of a second feedback scheme for multicast transmissions in the NTN. In some aspects, to determine the applied feedback scheme, the feedback scheme component 630 may be configured as or otherwise support a means for determining the applied feedback scheme based on the first feedback scheme and the second feedback scheme.

In some aspects, the first feedback scheme corresponds to enabling feedback reporting for a multicast G-RNTI and the second feedback scheme corresponds to disabling feedback reporting for a HARQ process ID.

In some aspects, the UE DCI component 645 may be configured as or otherwise support a means for receiving DCI that associates the multicast transmission with the multicast G-RNTI and the HARQ ID.

In some aspects, a message type of the first control information is a RRC message type or a DCI message type.

In some aspects, the applied feedback scheme is pro-cessed as an error case that results from the first feedback scheme being indicated by the first control information and the second feedback scheme being indicated by the second control information.

In some aspects, to support operating in accordance to the applied feedback scheme, the feedback reporting component 640 may be configured as or otherwise support a means for refraining from reporting the feedback based on the first feedback scheme being indicated by the first control information and the second feedback scheme being indicated by the second control information.

In some aspects, to support operating in accordance to the applied feedback scheme, the feedback reporting component 640 may be configured as or otherwise support a means for populating a codebook with feedback determined from a detection result of the multicast transmission based on the first feedback scheme being indicated by the first control information and the second feedback scheme being indicated by the second control information.

In some aspects, to support operating in accordance to the applied feedback scheme, the feedback reporting component 640 may be configured as or otherwise support a means for populating a codebook with NACK feedback, based on the first feedback scheme being indicated by the first control information and the second feedback scheme being indicated by the second control information.

In some aspects, the feedback alternatives component 655 may be configured as or otherwise support a means for receiving third control information indicating a set of feedback reporting alternatives. In some aspects, the feedback alternatives component 655 may be configured as or otherwise support a means for determining a feedback reporting alternative from the set of feedback reporting alternatives based on the first feedback scheme being indicated by the first control information and the second feedback scheme being indicated by the second control information, where the applied feedback scheme is based on the determined feedback reporting alternative.

In some aspects, the applied feedback scheme is based on a feedback codebook type configured for the multicast transmission.

In some aspects, the UE capability component 650 may be configured as or otherwise support a means for transmitting, to a second network node, a capability message of the first network node, where the first feedback scheme indicated in the first control information is based on the capability message.

Figure 7:
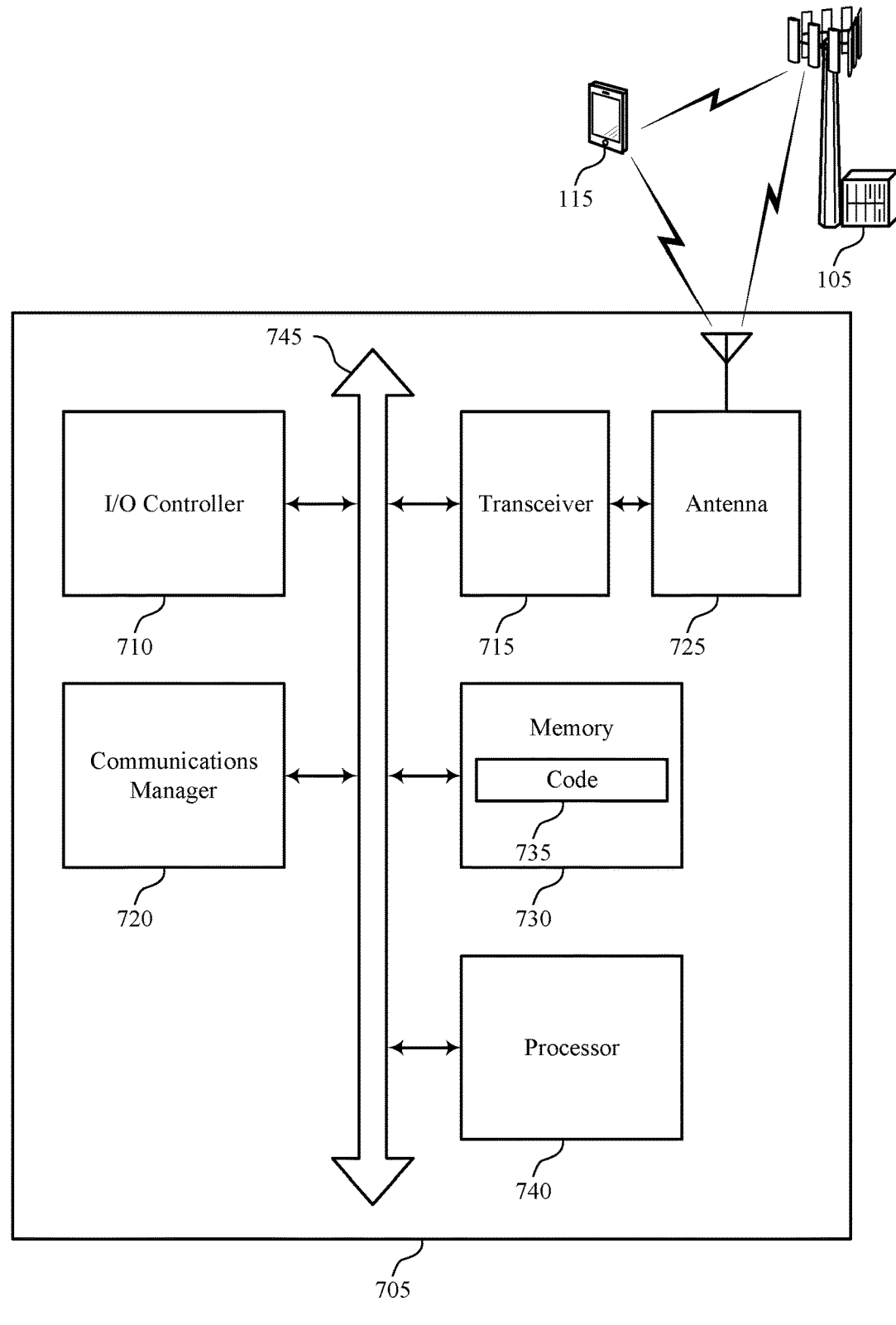
FIG. 7 shows a diagram of a system including a device that supports feedback reporting for multicast communication in an NTN in accordance with one or more aspects of the present disclosure.

FIG. 7 shows a diagram of a system 700 including a device 705 that supports feedback reporting for multicast communication in an NTN in accordance with one or more aspects of the present disclosure. The device 705 may be an aspect of or include the components of a device 405, a device 505, a UE 115, or a network node as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an aspect of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting feedback reporting for multicast communication in an NTN). For example, the device 705 or a component of the device 705 may include a processor 740 and memory 730 coupled with or to the processor 740, the processor 740 and memory 730 configured to perform various functions described herein.

The communications manager 720 may support wireless communication at a first network node in accordance with aspects as disclosed herein. For example, the communications manager 720 may be configured as or otherwise support a means for receiving first control information indicative of a first feedback scheme for multicast transmissions in an NTN. The communications manager 720 may be configured as or otherwise support a means for determining an applied feedback scheme based on the first feedback scheme. The communications manager 720 may be configured as or otherwise support a means for monitoring for a multicast transmission. The communications manager 720 may be configured as or otherwise support a means for operating in accordance with the applied feedback scheme. In some aspects, to operate in accordance with the applied feedback scheme, the communications manager 720 may be configured as or otherwise support a means for determining whether to report feedback associated with the multicast transmission.

By including or configuring the communications manager 720 in accordance with aspects as described herein, the device 705 may support techniques for improved communication reliability, reduced latency, and improved coordination between devices.

In some aspects, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some aspects, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of feedback reporting for multicast communication in an NTN as described herein, or the processor 740 and the memory 730 may be otherwise configured to perform or support such operations.

Figure 8:
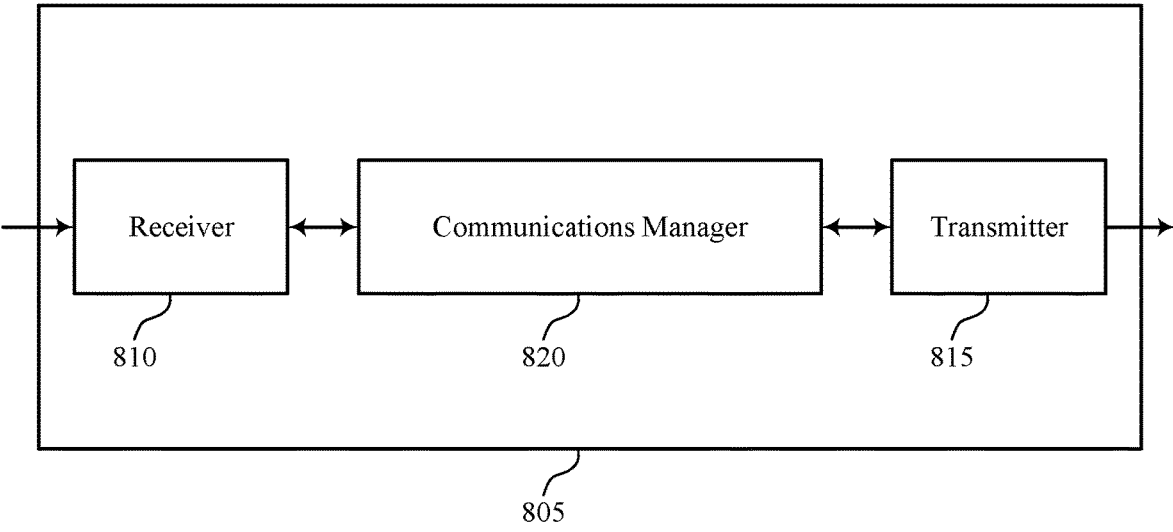
FIGS. 8 and 9 show block diagrams of devices that support feedback reporting for multicast communication in an NTN in accordance with one or more aspects of the present disclosure.

FIG. 8 shows a block diagram 800 of a device 805 that supports feedback reporting for multicast communication in an NTN in accordance with one or more aspects of the present disclosure. The device 805 may be an example of aspects of a network entity 105 or a network node as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some aspects, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some aspects, the transmitter 815 and the receiver 810 may be co-located in a transceiver, which may include or be coupled with a modem.

The communications manager 820, the receiver 810, the transmitter 815, or various combinations thereof or various components thereof may be aspects of means for performing various aspects of feedback reporting for multicast communication in an NTN as described herein. For example, the communications manager 820, the receiver 810, the transmitter 815, or various combinations or components thereof may support a method for performing one or more of the functions described herein.

In some aspects, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first network node in accordance with aspects as disclosed herein. For example, the communications manager 820 may be configured as or otherwise support a means for transmitting first control information indicative of a first feedback scheme for multicast transmissions in an NTN. The communications manager 820 may be configured as or otherwise support a means for transmitting a multicast transmission. The communications manager 820 may be configured as or otherwise support a means for monitoring for feedback associated with the multicast transmission in accordance with an applied feedback scheme used by a second network node, where the applied feedback scheme is based on the first feedback scheme.

By including or configuring the communications manager 820 in accordance with aspects as described herein, the device 805 (e.g., a processor controlling or otherwise coupled with the receiver 810, the transmitter 815, the communications manager 820, or a combination thereof) may support techniques for reduced processing and more efficient utilization of communication resources.

Figure 9:
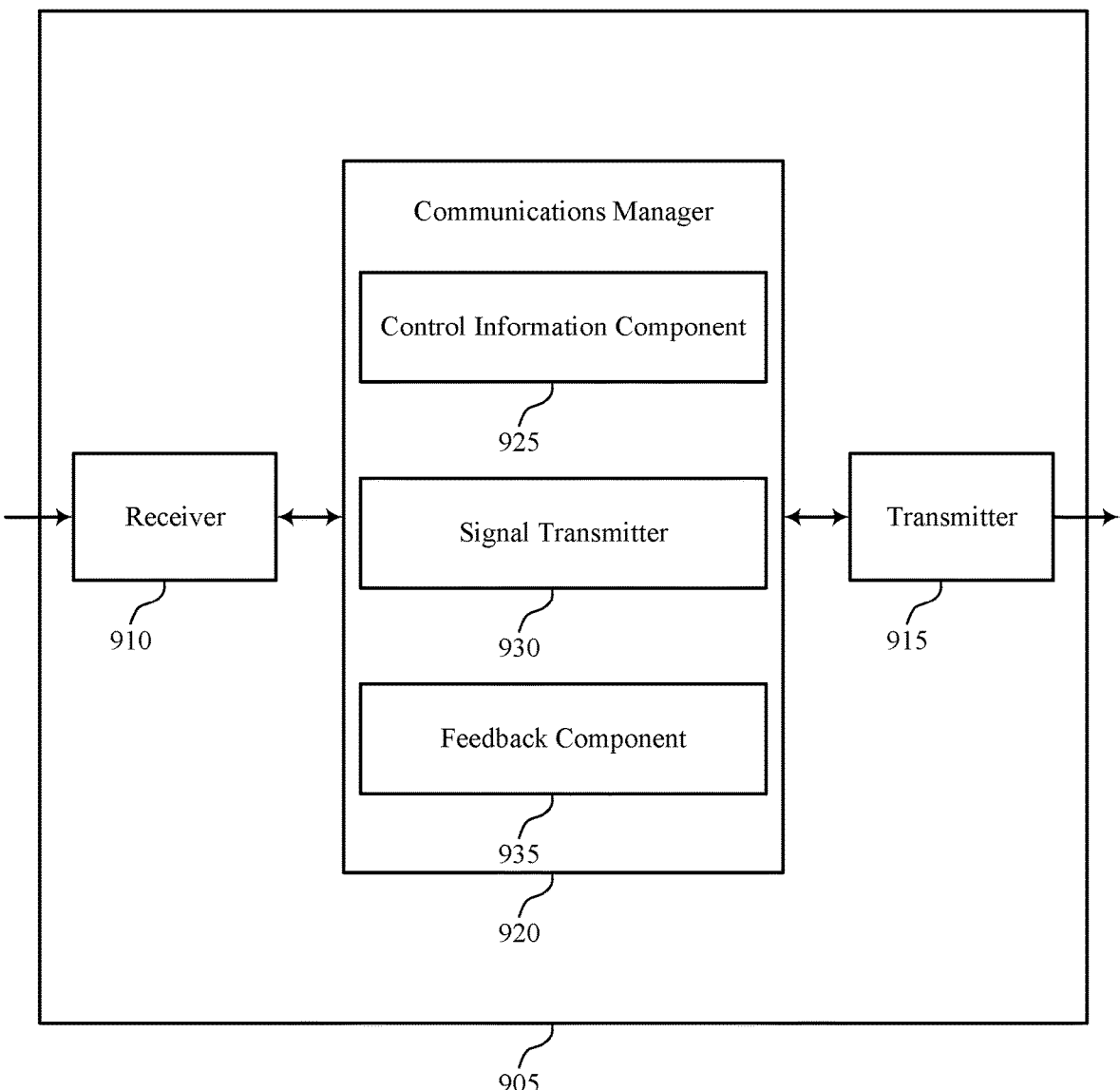

FIG. 9 shows a block diagram 900 of a device 905 that supports feedback reporting for multicast communication in an NTN in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some aspects, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some aspects, the transmitter 915 and the receiver 910 may be co-located in a transceiver, which may include or be coupled with a modem.

The device 905, or various components thereof, may be an aspect of means for performing various aspects of feedback reporting for multicast communication in an NTN as described herein. For example, the communications manager 920 may include a control information component 925, a signal transmitter 930, a feedback component 935, or any combination thereof. The communications manager 920 may be an example of aspects of a communications manager 820 as described herein. In some aspects, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first network node in accordance with aspects as disclosed herein. The control information component 925 may be configured as or otherwise support a means for transmitting first control information indicative of a first feedback scheme for multicast transmissions in an NTN. The signal transmitter 930 may be configured as or otherwise support a means for transmitting a multicast transmission. The feedback component 935 may be configured as or otherwise support a means for monitoring for feedback associated with the multicast transmission in accordance with an applied feedback scheme used by a second network node, where the applied feedback scheme is based on the first feedback scheme.

Figure 10:
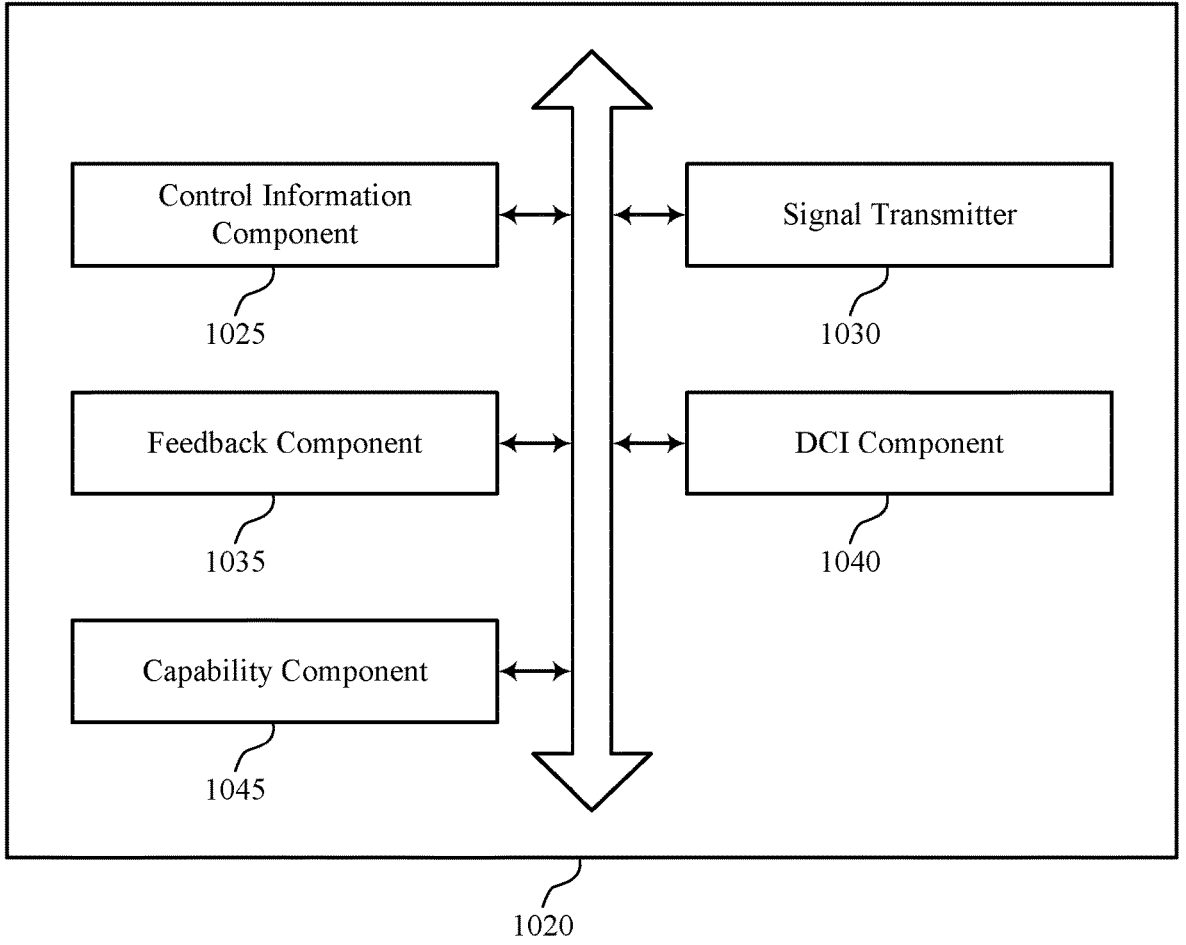
FIG. 10 shows a block diagram of a communications manager that supports feedback reporting for multicast communication in an NTN in accordance with one or more aspects of the present disclosure.

FIG. 10 shows a block diagram 1000 of a communications manager 1020 that supports feedback reporting for multicast communication in an NTN in accordance with one or more aspects of the present disclosure. The communications manager 1020 may be an example of aspects of a communications manager 820, a communications manager 920, or both, as described herein. The communications manager 1020, or various components thereof, may be an aspect of means for performing various aspects of feedback reporting for multicast communication in an NTN as described herein. For example, the communications manager 1020 may include a control information component 1025, a signal transmitter 1030, a feedback component 1035, a DCI component 1040, a capability component 1045, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a first network node in accordance with aspects as disclosed herein. The control information component 1025 may be configured as or otherwise support a means for transmitting first control information indicative of a first feedback scheme for multicast transmissions in an NTN. The signal transmitter 1030 may be configured as or otherwise support a means for transmitting a multicast transmission. The feedback component 1035 may be configured as or otherwise support a means for monitoring for feedback associated with the multicast transmission in accordance with an applied feedback scheme used by a second network node, where the applied feedback scheme is based on the first feedback scheme.

In some aspects, the first feedback scheme corresponds to reporting feedback on a per-HARQ process ID basis or on a per-multicast G-RNTI basis.

In some aspects, to support transmitting the first control information, the control information component 1025 may be configured as or otherwise support a means for transmitting unicast RRC signaling, where the unicast RRC signaling include the first control information, and where the first feedback scheme corresponds to reporting feedback on a per-HARQ process ID basis.

In some aspects, the DCI component 1040 may be configured as or otherwise support a means for transmitting DCI that associates the multicast transmission with a HARQ process ID.

In some aspects, to support transmitting the first control information, the control information component 1025 may be configured as or otherwise support a means for transmitting unicast RRC signaling, where the unicast RRC signaling includes the first control information, and where the first feedback scheme corresponds to reporting feedback on a per-multicast G-RNTI basis.

In some aspects, the DCI component 1040 may be configured as or otherwise support a means for transmitting DCI that associates the multicast transmission with a multicast G-RNTI.

In some aspects, to support transmitting the first control information, the DCI component 1040 may be configured as or otherwise support a means for transmitting multicast DCI, where the multicast DCI includes the first control information, and where the first feedback scheme corresponds to reporting feedback on a per-multicast G-RNTI basis, the multicast DCI also associating the multicast transmission with a multicast G-RNTI.

In some aspects, the control information component 1025 may be configured as or otherwise support a means for transmitting second control information indicative of a second feedback scheme for multicast transmissions in an NTN. In some aspects, the feedback component 1035 may be configured as or otherwise support a means for identifying the applied feedback scheme based on the first feedback scheme and the second feedback scheme.

In some aspects, the first feedback scheme corresponds to enabling feedback reporting for a multicast G-RNTI and the second feedback scheme corresponds to disabling feedback reporting for a HARQ process ID.

In some aspects, a message type of the first control information is a RRC message type or a DCI message type.

In some aspects, the DCI component 1040 may be configured as or otherwise support a means for receiving DCI that associates the multicast transmission with the multicast G-RNTI and the HARQ ID.

In some aspects, the applied feedback scheme includes the second network node populating a codebook with the feedback associated with the multicast transmission based on the first feedback scheme being indicated by the first control information and the second feedback scheme being indicated by the second control information.

In some aspects, the applied feedback scheme includes the second network node populating a codebook with NACK feedback, based on the first feedback scheme being indicated by the first control information and the second feedback scheme being indicated by the second control information.

In some aspects, the control information component 1025 may be configured as or otherwise support a means for transmitting third control information indicating a set of feedback reporting alternatives, where the applied feedback scheme is based on the set of feedback reporting alternatives.

In some aspects, the applied feedback scheme is based on a feedback codebook type configured for the multicast transmission.

In some aspects, the capability component 1045 may be configured as or otherwise support a means for receive, from the second network node, a capability message of the second network node, where the first feedback scheme indicated in the first control information is based on the capability message.

Figure 11:
FIG. 11 shows a diagram of a system including a device that supports feedback reporting for multicast communication in an NTN in accordance with one or more aspects of the present disclosure.

FIG. 11 shows a diagram of a system 1100 including a device 1105 that supports feedback reporting for multicast communication in an NTN in accordance with one or more aspects of the present disclosure. The device 1105 may be an aspect of or include the components of a device 805, a device 905, a network entity 105, or a network node as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some aspects, the transceiver 1110 may include a wired transceiver and may communicate bi-directionally with another wired transceiver. Additionally, or alternatively, in some aspects, the transceiver 1110 may include a wireless transceiver and may communicate bi-directionally with another wireless transceiver. In some aspects, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an aspect of a transmitter 815, a transmitter 915, a receiver 810, a receiver 910, or any combination thereof or component thereof, as described herein. In some aspects, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting feedback reporting for multicast communication in an NTN). For example, the device 1105 or a component of the device 1105 may include a processor 1135 and memory 1125 coupled with the processor 1135, the processor 1135 and memory 1125 configured to perform various functions described herein. The processor 1135 may be an aspect of a cloud-computing platform (e.g., one or more physical nodes and supporting software such as operating systems, virtual machines, or container instances) that may host the functions (e.g., by executing code 1130) to perform the functions of the device 1105.

In some aspects, a bus 1140 may support communications of (e.g., within) a protocol layer of a protocol stack. In some aspects, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some aspects, the communications manager 1120 may manage aspects of communications with a core network 130 (e.g., via one or more wired or wireless backhaul links). For example, the communications manager 1120 may manage the transfer of data communications for client devices, such as one or more UEs 115. In some aspects, the communications manager 1120 may manage communications with other network entities 105, and may include a controller or scheduler for controlling communications with UEs 115 in cooperation with other network entities 105. In some aspects, the communications manager 1120 may support an X2 interface within an LTE/LTE-A wireless communications network technology to provide communication between network entities 105.

The communications manager 1120 may support wireless communication at a first network node in accordance with aspects as disclosed herein. For example, the communications manager 1120 may be configured as or otherwise support a means for transmitting first control information indicative of a first feedback scheme for multicast transmissions in an NTN. The communications manager 1120 may be configured as or otherwise support a means for transmitting a multicast transmission. The communications manager 1120 may be configured as or otherwise support a means for monitoring for feedback associated with the multicast transmission in accordance with an applied feedback scheme used by a second network node, where the applied feedback scheme is based on the first feedback scheme.

By including or configuring the communications manager 1120 in accordance with aspects as described herein, the device 1105 may support techniques for improved communication reliability, reduced latency, and more efficient utilization of communication resources.

In some aspects, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some aspects, one or more functions described with reference to the communications manager 1120 may be supported by or performed by the processor 1135, the memory 1125, the code 1130, the transceiver 1110, or any combination thereof.

For example, the code 1130 may include instructions executable by the processor 1135 to cause the device 1105 to perform various aspects of feedback reporting for multicast communication in an NTN as described herein, or the processor 1135 and the memory 1125 may be otherwise configured to perform or support such operations.

FIG. 12 shows a flowchart illustrating a method 1200 that supports feedback reporting for multicast communication in an NTN in accordance with one or more aspects of the present disclosure. The operations of the method 1200 may be implemented by a UE, a network node, or its components as described herein. For example, the operations of the method 1200 may be performed by a UE 115 as described with reference to FIGS. 1 through 7. In some aspects, a UE may execute a set of instructions to control the functional elements of the UE to perform the described functions. Additionally, or alternatively, the UE may perform aspects of the described functions using special-purpose hardware.

At 1205, the method may include receiving first control information indicative of a first feedback scheme for multicast transmissions in an NTN. The operations of 1205 may be performed in accordance with aspects as disclosed herein. In some aspects, aspects of the operations of 1205 may be performed by a UE control information component 625 as described with reference to FIG. 6.

At 1210, the method may include determining an applied feedback scheme based on the first feedback scheme. The operations of 1210 may be performed in accordance with aspects as disclosed herein. In some aspects, aspects of the operations of 1210 may be performed by a feedback scheme component 630 as described with reference to FIG. 6.

At 1215, the method may include monitoring for a multicast transmission. The operations of 1215 may be performed in accordance with aspects as disclosed herein. In some aspects, aspects of the operations of 1215 may be performed by a monitoring component 635 as described with reference to FIG. 6.

At 1220, the method may include operating in accordance with the applied feedback scheme. In some aspects, operating in accordance with the applied feedback scheme may include determining whether to report feedback associated with the multicast transmission. The operations of 1220 may be performed in accordance with aspects as disclosed herein. In some aspects, aspects of the operations of 1220 may be performed by a feedback reporting component 640 as described with reference to FIG. 6.

FIG. 13 shows a flowchart illustrating a method 1300 that supports feedback reporting for multicast communication in an NTN in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some aspects, a UE may execute a set of instructions to control the functional elements of the UE to perform the described functions. Additionally, or alternatively, the UE may perform aspects of the described functions using special-purpose hardware.

At 1305, the method may include receiving unicast RRC signaling, where the unicast RRC signaling includes the first control information indicative of a first feedback scheme for multicast transmissions in an NTN, and where the first feedback scheme corresponds to reporting feedback on a per-HARQ process ID basis. The operations of 1305 may be performed in accordance with aspects as disclosed herein. In some aspects, aspects of the operations of 1305 may be performed by a UE control information component 625 as described with reference to FIG. 6.

At 1310, the method may include determining an applied feedback scheme based on the first feedback scheme. The operations of 1310 may be performed in accordance with aspects as disclosed herein. In some aspects, aspects of the operations of 1310 may be performed by a feedback scheme component 630 as described with reference to FIG. 6.

At 1315, the method may include monitoring for a multicast transmission. The operations of 1315 may be performed in accordance with aspects as disclosed herein. In some aspects, aspects of the operations of 1315 may be performed by a monitoring component 635 as described with reference to FIG. 6.

At 1320, the method may include operating in accordance with the applied feedback scheme. In some aspects, operating in accordance with the applied feedback scheme may include determining whether to report feedback associated with the multicast transmission. The operations of 1320 may be performed in accordance with aspects as disclosed herein. In some aspects, aspects of the operations of 1320 may be performed by a feedback reporting component 640 as described with reference to FIG. 6.

FIG. 14 shows a flowchart illustrating a method 1400 that supports feedback reporting for multicast communication in an NTN in accordance with one or more aspects of the present disclosure. The operations of the method 1400 may be implemented by a UE or its components as described herein. For example, the operations of the method 1400 may be performed by a UE 115 as described with reference to FIGS. 1 through 7. In some aspects, a UE may execute a set of instructions to control the functional elements of the UE to perform the described functions. Additionally, or alternatively, the UE may perform aspects of the described functions using special-purpose hardware.

At 1405, the method may include receiving unicast RRC signaling, where the unicast RRC signaling includes the first control information indicative of a first feedback scheme for multicast transmissions in an NTN, and where the first feedback scheme corresponds to reporting feedback on a per-multicast G-RNTI basis. The operations of 1405 may be performed in accordance with aspects as disclosed herein. In some aspects, aspects of the operations of 1405 may be performed by a UE control information component 625 as described with reference to FIG. 6.

At 1410, the method may include determining an applied feedback scheme based on the first feedback scheme. The operations of 1410 may be performed in accordance with aspects as disclosed herein. In some aspects, aspects of the operations of 1410 may be performed by a feedback scheme component 630 as described with reference to FIG. 6.

At 1415, the method may include monitoring for a multicast transmission. The operations of 1415 may be performed in accordance with aspects as disclosed herein. In some aspects, aspects of the operations of 1415 may be performed by a monitoring component 635 as described with reference to FIG. 6.

At 1420, the method may include operating in accordance with the applied feedback scheme. In some aspects, operating in accordance with the applied feedback scheme may include determining whether to report feedback associated with the multicast transmission. The operations of 1420 may be performed in accordance with aspects as disclosed herein. In some aspects, aspects of the operations of 1420 may be performed by a feedback reporting component 640 as described with reference to FIG. 6.

FIG. 15 shows a flowchart illustrating a method 1500 that supports feedback reporting for multicast communication in an NTN in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some aspects, a network entity may execute a set of instructions to control the functional elements of the network entity to perform the described functions. Additionally, or alternatively, the network entity may perform aspects of the described functions using special-purpose hardware.

At 1505, the method may include transmitting first control information indicative of a first feedback scheme for multicast transmissions in an NTN. The operations of 1505 may be performed in accordance with aspects as disclosed herein. In some aspects, aspects of the operations of 1505 may be performed by a control information component 1025 as described with reference to FIG. 10.

At 1510, the method may include transmitting a multicast transmission. The operations of 1510 may be performed in accordance with aspects as disclosed herein. In some aspects, aspects of the operations of 1510 may be performed by a signal transmitter 1030 as described with reference to FIG. 10.

At 1515, the method may include monitoring for feedback associated with the multicast transmission in accordance with an applied feedback scheme used by a second network node, where the applied feedback scheme is based on the first feedback scheme. The operations of 1515 may be performed in accordance with aspects as disclosed herein. In some aspects, aspects of the operations of 1515 may be performed by a feedback component 1035 as described with reference to FIG. 10.

FIG. 16 shows a flowchart illustrating a method 1600 that supports feedback reporting for multicast communication in an NTN in accordance with one or more aspects of the present disclosure. The operations of the method 1600 may be implemented by a network entity or its components as described herein. For example, the operations of the method 1600 may be performed by a network entity as described with reference to FIGS. 1 through 3 and 8 through 11. In some aspects, a network entity may execute a set of instructions to control the functional elements of the network entity to perform the described functions. Additionally, or alternatively, the network entity may perform aspects of the described functions using special-purpose hardware.

At 1605, the method may include transmitting unicast RRC signaling, where the unicast RRC signaling include the first control information indicative of a first feedback scheme for multicast transmissions in an NTN, and where the first feedback scheme corresponds to reporting feedback on a per-HARQ process ID basis. The operations of 1605 may be performed in accordance with aspects as disclosed herein. In some aspects, aspects of the operations of 1605 may be performed by a control information component 1025 as described with reference to FIG. 10.

At 1610, the method may include transmitting a multicast transmission. The operations of 1610 may be performed in accordance with aspects as disclosed herein. In some aspects, aspects of the operations of 1610 may be performed by a signal transmitter 1030 as described with reference to FIG. 10.

At 1615, the method may include monitoring for feedback associated with the multicast transmission in accordance with an applied feedback scheme used by a second network node, where the applied feedback scheme is based on the first feedback scheme. The operations of 1615 may be performed in accordance with aspects as disclosed herein. In some aspects, aspects of the operations of 1615 may be performed by a feedback component 1035 as described with reference to FIG. 10.

FIG. 17 shows a flowchart illustrating a method 1700 that supports feedback reporting for multicast communication in an NTN in accordance with one or more aspects of the present disclosure. The operations of the method 1700 may be implemented by a network entity or its components as described herein. For example, the operations of the method 1700 may be performed by a network entity as described with reference to FIGS. 1 through 3 and 8 through 11. In some aspects, a network entity may execute a set of instructions to control the functional elements of the network entity to perform the described functions. Additionally, or alternatively, the network entity may perform aspects of the described functions using special-purpose hardware.

At 1705, the method may include transmitting unicast RRC signaling, where the unicast RRC signaling includes the first control information indicative of a first feedback scheme for multicast transmissions in an NTN, and where the first feedback scheme corresponds to reporting feedback on a per-multicast G-RNTI basis. The operations of 1705 may be performed in accordance with aspects as disclosed herein. In some aspects, aspects of the operations of 1705 may be performed by a control information component 1025 as described with reference to FIG. 10.

At 1710, the method may include transmitting a multicast transmission. The operations of 1710 may be performed in accordance with aspects as disclosed herein. In some aspects, aspects of the operations of 1710 may be performed by a signal transmitter 1030 as described with reference to FIG. 10.

At 1715, the method may include monitoring for feedback associated with the multicast transmission in accordance with an applied feedback scheme used by a second network node, where the applied feedback scheme is based on the first feedback scheme. The operations of 1715 may be performed in accordance with aspects as disclosed herein. In some aspects, aspects of the operations of 1715 may be performed by a feedback component 1035 as described with reference to FIG. 10.

The following provides an overview of aspects of the present disclosure:

Aspect 1: A method for wireless communication at a first network node, comprising: receiving first control information indicative of a first feedback scheme for multicast transmissions in an NTN; determining an applied feedback scheme based on the first feedback scheme; monitoring for a multicast transmission; and operating in accordance with the applied feedback scheme, wherein operating in accordance with the applied feedback scheme comprises: determining whether to report feedback associated with the multicast transmission.

Aspect 2: The method of aspect 1, wherein the first feedback scheme corresponds to reporting feedback on a per-HARQ process ID basis or on a per-multicast G-RNTI basis.

Aspect 3: The method of any of aspects 1 through 2, wherein receiving the first control information comprises: receiving unicast RRC signaling, wherein the unicast RRC signaling includes the first control information, and wherein the first feedback scheme corresponds to reporting feedback on a per-HARQ process ID basis.

Aspect 4: The method of aspect 3, further comprising: receiving DCI that associates the multicast transmission with a HARQ process ID.

Aspect 5: The method of any of aspects 1 through 4, wherein receiving the first control information comprising receiving unicast RRC signaling, wherein the unicast RRC signaling includes the first control information, and wherein the first feedback scheme corresponds to reporting feedback on a per-multicast G-RNTI basis.

Aspect 6: The method claim 5, further comprising: receiving DCI that associates the multicast transmission with a multicast G-RNTI.

Aspect 7: The method of aspect 1, wherein receiving the first control information comprises: receiving multicast DCI, wherein the multicast DCI includes the first control information, and wherein the first feedback scheme corresponds to reporting feedback on a per-multicast G-RNTI basis, the multicast DCI also associating the multicast transmission with a multicast G-RNTI.

Aspect 8: The method of any of aspects 1 through 7, further comprising: receiving second control information indicative of a second feedback scheme for multicast transmissions in the NTN, wherein determining the applied feedback scheme comprises: determining the applied feedback scheme based on the first feedback scheme and the second feedback scheme.

Aspect 9: The method of aspect 8, wherein the first feedback scheme corresponds to enabling feedback reporting for a multicast G-RNTI and the second feedback scheme corresponds to disabling feedback reporting for a HARQ process ID.

Aspect 10: The method of aspect 9, further comprising: receiving DCI that associates the multicast transmission with the multicast G-RNTI and the HARQ ID.

Aspect 11: The method of any of aspects 8 through 10, wherein a message type of the first control information is a RRC message type or a DCI message type.

Aspect 12: The method of any of aspects 8 through 11, wherein the applied feedback scheme is processed as an error case that results from the first feedback scheme being indicated by the first control information and the second feedback scheme being indicated by the second control information.

Aspect 13: The method of any of aspects 8 through 11, wherein operating in accordance to the applied feedback scheme comprises: refraining from reporting the feedback based on the first feedback scheme being indicated by the first control information and the second feedback scheme being indicated by the second control information.

Aspect 14: The method of any of aspects 8 through 11, wherein operating in accordance to the applied feedback scheme comprises: populating a codebook with feedback determined from a detection result of the multicast transmission based on the first feedback scheme being indicated by the first control information and the second feedback scheme being indicated by the second control information.

Aspect 15: The method of any of aspects 8 through 11, wherein operating in accordance to the applied feedback scheme comprises: populating a codebook with NACK feedback, based on the first feedback scheme being indicated by the first control information and the second feedback scheme being indicated by the second control information.

Aspect 16: The method of any of aspects 8 through 15, further comprising: receiving third control information indicating a set of feedback reporting alternatives; and determining a feedback reporting alternative from the set of feedback reporting alternatives based on the first feedback scheme being indicated by the first control information and the second feedback scheme being indicated by the second control information, wherein the applied feedback scheme is based on the determined feedback reporting alternative.

Aspect 17: The method of any of aspects 1 through 16, wherein the applied feedback scheme is based on a feedback codebook type configured for the multicast transmission.

Aspect 18: The method of any of aspects 1 through 17, further comprising: transmitting, to a second network node, a capability message of the first network node, wherein the first feedback scheme indicated in the first control information is based on the capability message.

Aspect 19: A method for wireless communication at a first network node, comprising: transmitting first control information indicative of a first feedback scheme for multicast transmissions in an NTN; transmitting a multicast transmission; and monitoring for feedback associated with the multicast transmission in accordance with an applied feedback scheme used by a second network node, wherein the applied feedback scheme is based on the first feedback scheme.

Aspect 20: The method of aspect 19, wherein the first feedback scheme corresponds to reporting feedback on a per-HARQ process ID basis or on a per-multicast G-RNTI basis.

Aspect 21: The method of any of aspects 19 through 20, wherein transmitting the first control information comprises: transmitting unicast RRC signaling, wherein the unicast RRC signaling include the first control information, and wherein the first feedback scheme corresponds to reporting feedback on a per-HARQ process ID basis.

Aspect 22: The method of aspect 21, further comprising: transmitting DCI that associates the multicast transmission with a HARQ process ID.

Aspect 23: The method of any of aspects 19 through 22, wherein transmitting the first control information comprises: transmitting unicast RRC signaling, wherein the unicast RRC signaling includes the first control information, and wherein the first feedback scheme corresponds to reporting feedback on a per-multicast G-RNTI basis.

Aspect 24: The method of aspect 23, further comprising: transmitting DCI that associates the multicast transmission with a multicast G-RNTI.

Aspect 25: The method of aspect 19, wherein transmitting the first control information comprises: transmitting multicast DCI, wherein the multicast DCI includes the first control information, and wherein the first feedback scheme corresponds to reporting feedback on a per-multicast G-RNTI basis, the multicast DCI also associating the multicast transmission with a multicast G-RNTI.

Aspect 26: The method of any of aspects 19 through 25, further comprising: transmitting second control information indicative of a second feedback scheme for multicast transmissions in an NTN; and identifying the applied feedback scheme based on the first feedback scheme and the second feedback scheme.

Aspect 27: The method of aspect 26, wherein the first feedback scheme corresponds to enabling feedback reporting for a multicast G-RNTI and the second feedback scheme corresponds to disabling feedback reporting for a HARQ process ID.

Aspect 28: The method of any of aspects 26 through 27, wherein a message type of the first control information is a RRC message type or a DCI message type.

Aspect 29: The method of aspect 28, further comprising: receiving DCI that associates the multicast transmission with the multicast G-RNTI and the HARQ ID.

Aspect 30: The method of any of aspects 26 through 29, wherein the applied feedback scheme comprises the second network node populating a codebook with the feedback associated with the multicast transmission based on the first feedback scheme being indicated by the first control information and the second feedback scheme being indicated by the second control information.

Aspect 31: The method of any of aspects 26 through 29, wherein the applied feedback scheme comprises the second network node populating a codebook with NACK feedback, based on the first feedback scheme being indicated by the first control information and the second feedback scheme being indicated by the second control information.

Aspect 32: The method of any of aspects 26 through 31, further comprising: transmitting third control information indicating a set of feedback reporting alternatives, wherein the applied feedback scheme is based on the set of feedback reporting alternatives.

Aspect 33: The method of any of aspects 19 through 32, wherein the applied feedback scheme is based on a feedback codebook type configured for the multicast transmission.

Aspect 34: The method of any of aspects 19 through 33, further comprising: receive, from the second network node, a capability message of the second network node, wherein the first feedback scheme indicated in the first control information is based on the capability message.

Aspect 35: An apparatus for wireless communication at a first network node, comprising a memory and at least one processor coupled to the memory, the at least on processor configured to perform a method of any of aspects 1 through 18.

Aspect 36: An apparatus for wireless communication at a first network node, comprising at least one means for performing a method of any of aspects 1 through 18.

Aspect 37: A non-transitory computer-readable medium storing code for wireless communication stored thereon that, when executed by a first network node, causes the first network node to perform a method of any of aspects 1 through 18.

Aspect 38: An apparatus for wireless communication at a first network node, comprising a memory and at least one processor coupled to the memory, the at least on processor configured to perform a method of any of aspects 19 through 34.

Aspect 39: An apparatus for wireless communication at a first network node, comprising at least one means for performing a method of any of aspects 19 through 34.

Aspect 40: A non-transitory computer-readable medium storing code for wireless communication stored thereon that, when executed by a first network node, causes the first network node to perform a method of any of aspects 19 through 34.

The methods described herein describe possible implementations, and the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the aspects that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described aspects.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the aspects and designs described herein but is to be accorded the broadest scope consistent with the principles and novel features disclosed herein.

What is claimed is:

1. A first network node for wireless communication, comprising:
    a memory; and
    at least one processor coupled to the memory, wherein the at least one processor is configured to:
        receive first control information indicative of a first feedback scheme for multicast transmissions in a non-terrestrial network;
        receive second control information indicative of a second feedback scheme for multicast transmissions in the non-terrestrial network;
        determine an applied feedback scheme based on the first feedback scheme and the second feedback scheme;
        monitor for a multicast transmission; and
        operate in accordance with the applied feedback scheme, wherein to operate in accordance with the applied feedback scheme, the at least one processor is configured to:
            determine whether to report feedback associated with the multicast transmission.

2. The first network node of claim 1, wherein the first feedback scheme is on a per-hybrid automatic repeat request process identifier basis or on a per-multicast group radio network temporary identifier basis.

3. The first network node of claim 1, wherein, to receive the first control information, the at least one processor is configured to:
    receive unicast radio resource control signaling, wherein the unicast radio resource control signaling includes the first control information, and wherein the first feedback scheme is on a per-hybrid automatic repeat request process identifier basis.

4. The first network node of claim 3, wherein the at least one processor is further configured to:
    receive downlink control information that associates the multicast transmission with a hybrid automatic repeat request process identifier.

5. The first network node of claim 1, wherein, to receive the first control information, the at least one processor is configured to:
    receive unicast radio resource control signaling, wherein the unicast radio resource control signaling includes the first control information, and wherein the first feedback scheme is on a per-multicast group radio network temporary identifier basis.

6. The first network node of claim 5, wherein the at least one processor is further configured to:
    receive downlink control information that associates the multicast transmission with a multicast group radio network temporary identifier.

7. The first network node of claim 1, wherein, to receive the first control information, the at least one processor is configured to:
    receive multicast downlink control information, wherein the multicast downlink control information includes the first control information, and wherein the first feedback scheme is on a per-multicast group radio network temporary identifier basis, the multicast downlink control information also associating the multicast transmission with a multicast group radio network temporary identifier.

8. The first network node of claim 1, wherein the at least one processor is further configured to:
    transmit, to a second network node, a capability message of the first network node, wherein the first feedback scheme indicated in the first control information is based on the capability message.

9. The first network node of claim 1, wherein the first feedback scheme corresponds to enabling feedback reporting for a multicast group radio network temporary identifier and the second feedback scheme corresponds to disabling feedback reporting for a hybrid automatic repeat request process identifier.

10. The first network node of claim 9, wherein the at least one processor is further configured to:
    receive downlink control information that associates the multicast transmission with the multicast group radio network temporary identifier and the hybrid automatic repeat request process identifier.

11. The first network node of claim 1, wherein a message type of the first control information is a radio resource control message type or a downlink control information message type.

12. The first network node of claim 1, wherein the applied feedback scheme is processed as an error case that results from the first feedback scheme indicated by the first control information and the second feedback scheme indicated by the second control information.

13. The first network node of claim 1, wherein, to operate in accordance with the applied feedback scheme, the at least one processor is configured to:
    refrain from reporting the feedback based on the first feedback scheme indicated by the first control information and the second feedback scheme indicated by the second control information.

14. The first network node of claim 1, wherein, to operate in accordance with the applied feedback scheme, the at least one processor is configured to:
    populate a codebook with feedback determined from a detection result of the multicast transmission based on the first feedback scheme indicated by the first control information and the second feedback scheme indicated by the second control information.

15. The first network node of claim 1, wherein, to operate in accordance with the applied feedback scheme, the at least one processor is configured to:
    populate a codebook with negative acknowledgement feedback based on the first feedback scheme indicated by the first control information and the second feedback scheme indicated by the second control information.

16. The first network node of claim 1, wherein the applied feedback scheme is based on a feedback codebook type configured for the multicast transmission.

17. A first network node for wireless communication, comprising:
    a memory; and
    at least one processor coupled to the memory, wherein the at least one processor is configured to:
        receive first control information indicative of a first non-terrestrial network multicast transmission feedback scheme;
        receive second control information indicative of a second non-terrestrial network multicast transmission feedback scheme; and refrain from reporting multicast transmission feedback based on the first non-terrestrial network multicast transmission feedback scheme indicated by the first control information and the second non-terrestrial network multicast transmission feedback scheme indicated by the second control information.

18. A first network node for wireless communication, comprising:

a memory; and at least one processor coupled to the memory, wherein the at least one processor is configured to:

transmit first control information indicative of a first feedback scheme for multicast transmissions in a non-terrestrial network;

transmit second control information indicative of a second feedback scheme for multicast transmissions in a non-terrestrial network;

transmit a multicast transmission; and monitor for feedback associated with the multicast transmission in accordance with an applied feedback scheme, wherein the applied feedback scheme is based on the first feedback scheme and the second feedback scheme.

19. The first network node of claim 18, wherein the first feedback scheme is on a per-hybrid automatic repeat request process identifier basis or on a per-multicast group radio network temporary identifier basis.

20. The first network node of claim 18, wherein, to transmit the first control information, the at least one processor is configured to:

transmit unicast radio resource control signaling, wherein the unicast radio resource control signaling include the first control information, and wherein the first feedback scheme is on a per-hybrid automatic repeat request process identifier basis.

21. The first network node of claim 18, wherein, to transmit the first control information, the at least one processor is configured to:

transmit unicast radio resource control signaling, wherein the unicast radio resource control signaling includes the first control information, and wherein the first feedback scheme is on a per-multicast group radio network temporary identifier basis.

22. The first network node of claim 18, wherein, to transmit the first control information, the at least one processor is configured to:

transmit multicast downlink control information, wherein the multicast downlink control information includes the first control information, and wherein the first feedback scheme is on a per-multicast group radio network temporary identifier basis, the multicast downlink control information also associating the multicast transmission with a multicast group radio network temporary identifier.

23. The first network node of claim 18, wherein the at least one processor is further configured to:

receive, from the second network node, a capability message of the second network node, wherein the first feedback scheme indicated in the first control information is based on the capability message.

24. The first network node of claim 18, wherein the applied feedback scheme comprises a codebook with the feedback associated with the multicast transmission based on the first feedback scheme indicated by the first control information and the second feedback scheme indicated by the second control information.

25. The first network node of claim 18, wherein the applied feedback scheme is based on a feedback codebook type configured for the multicast transmission.

26. A first network node for wireless communication, comprising:

a memory; and at least one processor coupled to the memory, wherein the at least one processor is configured to:

receive first control information indicative of a first non-terrestrial network multicast transmission feedback scheme;

receive second control information indicative of a second non-terrestrial network multicast transmission feedback scheme; and determine, based on the first feedback scheme and the second feedback scheme, whether to report multicast transmission feedback.

27. The first network node of claim 26, wherein the first non-terrestrial network multicast feedback scheme is on a per-hybrid automatic repeat request process identifier basis.

28. The first network node of claim 26, wherein the first non-terrestrial network multicast feedback scheme is on a per-multicast group radio network temporary identifier basis.

29. The first network node of claim 26, wherein, to receive the first control information, the at least one processor is configured to:

receive unicast radio resource control signaling, wherein the unicast radio resource control signaling includes the first control information, and wherein the first non-terrestrial network multicast feedback scheme is on a per-hybrid automatic repeat request process identifier basis.

30. The first network node of claim 26, wherein, to receive the first control information, the at least one processor is configured to:

receive unicast radio resource control signaling, wherein the unicast radio resource control signaling includes the first control information, and wherein the first non-terrestrial network multicast feedback scheme is on a per-multicast group radio network temporary identifier basis.

31. The first network node of claim 26, wherein the first non-terrestrial network multicast transmission feedback scheme corresponds to enabling multicast transmission feedback reporting for a multicast group radio network temporary identifier and the second non-terrestrial network multicast transmission feedback scheme corresponds to disabling multicast transmission feedback reporting for a hybrid automatic repeat request process identifier.

* * * * *